US012476027B2

(12) United States Patent
Fukuchi

(10) Patent No.: US 12,476,027 B2
(45) Date of Patent: Nov. 18, 2025

(54) RESISTOR AND ITS MANUFACTURING METHOD

(71) Applicant: Proterial, Ltd., Tokyo (JP)

(72) Inventor: Keisuke Fukuchi, Tokyo (JP)

(73) Assignee: Proterial Ltd., Tokyo (JP)

( * ) Notice: Subject to any disclaimer, the term of this patent is extended or adjusted under 35 U.S.C. 154(b) by 413 days.

(21) Appl. No.: 18/071,866

(22) Filed: Nov. 30, 2022

(65) Prior Publication Data

US 2023/0178272 A1 Jun. 8, 2023

(30) Foreign Application Priority Data

Dec. 3, 2021 (JP) ................................ 2021-196800

(51) Int. Cl.

| | |
|---|---|
| ***H01C 1/028*** | (2006.01) |
| ***H01C 1/08*** | (2006.01) |
| ***H01C 1/148*** | (2006.01) |
| ***H01C 17/00*** | (2006.01) |

(52) U.S. Cl.

CPC ............... *H01C 1/028* (2013.01); *H01C 1/08* (2013.01); *H01C 1/148* (2013.01); *H01C 17/00* (2013.01)

(58) Field of Classification Search

CPC .......... H01C 1/028; H01C 1/08; H01C 1/148; H01C 17/00

See application file for complete search history.

(56) References Cited

U.S. PATENT DOCUMENTS

| | | | | | |
|---|---|---|---|---|---|
| 2,405,449 | A * | 8/1946 | Robinson | H01C 17/22 | 338/237 |
| 2,535,808 | A * | 12/1950 | Mucher | H01C 17/02 | 264/262 |
| 2,538,977 | A * | 1/1951 | Mucher | H05B 3/48 | 338/273 |
| 2,660,653 | A * | 11/1953 | Berkelhamer | H01C 1/028 | 338/264 |
| 3,063,100 | A * | 11/1962 | Kohring | B29C 63/18 | 338/273 |
| 3,238,489 | A * | 3/1966 | Hay | H01C 3/20 | 338/276 |
| 3,440,589 | A * | 4/1969 | Minks | H01C 1/084 | 174/521 |
| 2018/0047539 | A1* | 2/2018 | Kang | H01H 85/048 | |

FOREIGN PATENT DOCUMENTS

| | | | | |
|---|---|---|---|---|
| CN | 109300638 | * | 2/2019 | H01C 1/032 |
| JP | H3-85601 | U1 | 8/1991 | |
| JP | H04-153264 | A | 5/1992 | |
| JP | H05-047443 | Y2 | 12/1993 | |
| JP | H09-035923 | A | 2/1997 | |

(Continued)

OTHER PUBLICATIONS

JP-2009038275 translation (Year: 2009).*

(Continued)

*Primary Examiner* — Kyung S Lee

(74) *Attorney, Agent, or Firm* — Scully, Scott, Murphy & Presser, PC

(57) ABSTRACT

A resistor is composed of a resistor body part and a molded resin in which the resistor body part is embedded. The molded resin includes a base resin and a filler that is higher in thermal conductivity than the base resin.

4 Claims, 23 Drawing Sheets

(56) References Cited

FOREIGN PATENT DOCUMENTS

| | | | | |
|---|---|---|---|---|
| JP | 2007-173594 | A | | 7/2007 |
| JP | 2009-038275 | A | | 2/2009 |
| JP | 2009038275 | | * | 2/2009 |
| JP | 2014157891 | | * | 8/2014 |
| JP | 2018-050018 | A | | 3/2018 |
| JP | 2020-170742 | A | | 10/2020 |

OTHER PUBLICATIONS

JP-2014157891 translation (Year: 2014).*
CN-109300638 translation (Year: 2019).*
Notice of Reasons for Refusal dated May 20, 2025 received from the Japanese Patent Office in related JP 2021-196800 together with English language translation.

* cited by examiner

RESISTOR AND ITS MANUFACTURING METHOD

CROSS-REFERENCE TO RELATED APPLICATION

The present patent application claims the priority of Japanese patent application No. 2021-196800 filed on Dec. 3, 2021, and the entire contents thereof are hereby incorporated by reference.

TECHNICAL FIELD

The present invention relates to a resistor and a method for manufacturing the same.

BACKGROUND ART

Patent literature 1 discloses a cement resistor having a case, a resistive element placed inside the case, and a cement material that is filled inside the case to seal the resistive element.

CITATION LIST

Patent Literature

Patent Literature 1: JP2009-38275A

SUMMARY OF THE INVENTION

In the cement resistor described in Patent Literature 1, the heat generated in the resistive element is transferred through the cement and the case in turn and then dissipated outside the cement resistor. However, there is room for improvement in terms of improving heat dissipation.

The present invention was made in view of the circumstances as mentioned above, and the object of the invention is to provide a resistor and a manufacturing method of the resistor that can improve heat dissipation.

For solving the above problem, one aspect of the present invention provides a resistor, comprising:

- a resistor body part; and
- a molded resin in which the resistor body part is embedded, wherein the molded resin comprises a base resin and a filler having a higher thermal conductivity than the base resin.

For solving the above problem, another aspect of the present invention provides a method for manufacturing a resistor having a resistor body part and a molded resin in which the resistor body part is embedded, wherein the molded resin comprising a base resin and a filler having a higher thermal conductivity than the base resin,

- the method comprising:
- manufacturing the resistor body part;
- placing the resistor body part inside a mold; and
- injecting a raw material for the molded resin in a molten state inside the mold and curing the raw material to form the molded resin.

Effects of the Invention

According to the present invention, it is possible to provide the resistor and the manufacturing method of the resistor that can improve heat dissipation.

BEST MODE FOR CARRYING OUT THE INVENTION

First Embodiment

The first embodiment of the present invention will be described with reference to FIGS. 1 through 7. The embodiment described below is shown as a suitable concrete example for implementing the invention, and although there are parts that specifically illustrate various technically preferred technical matters, the technical scope of the invention is not limited to this concrete embodiment.

(Resistor 1)

Figure 1:
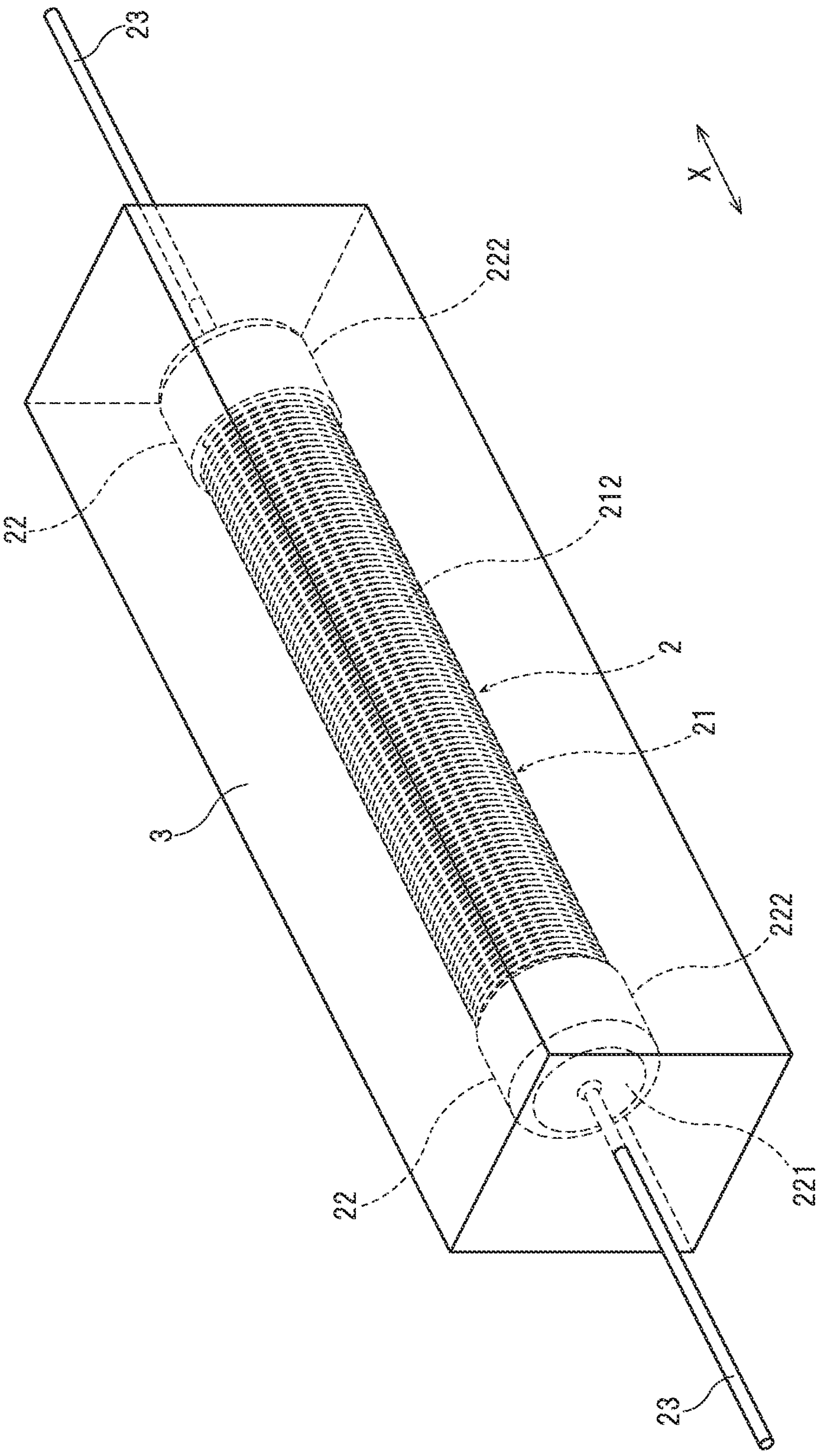
FIG. 1 is a perspective view of a resistor in a first embodiment.
Figure 2:
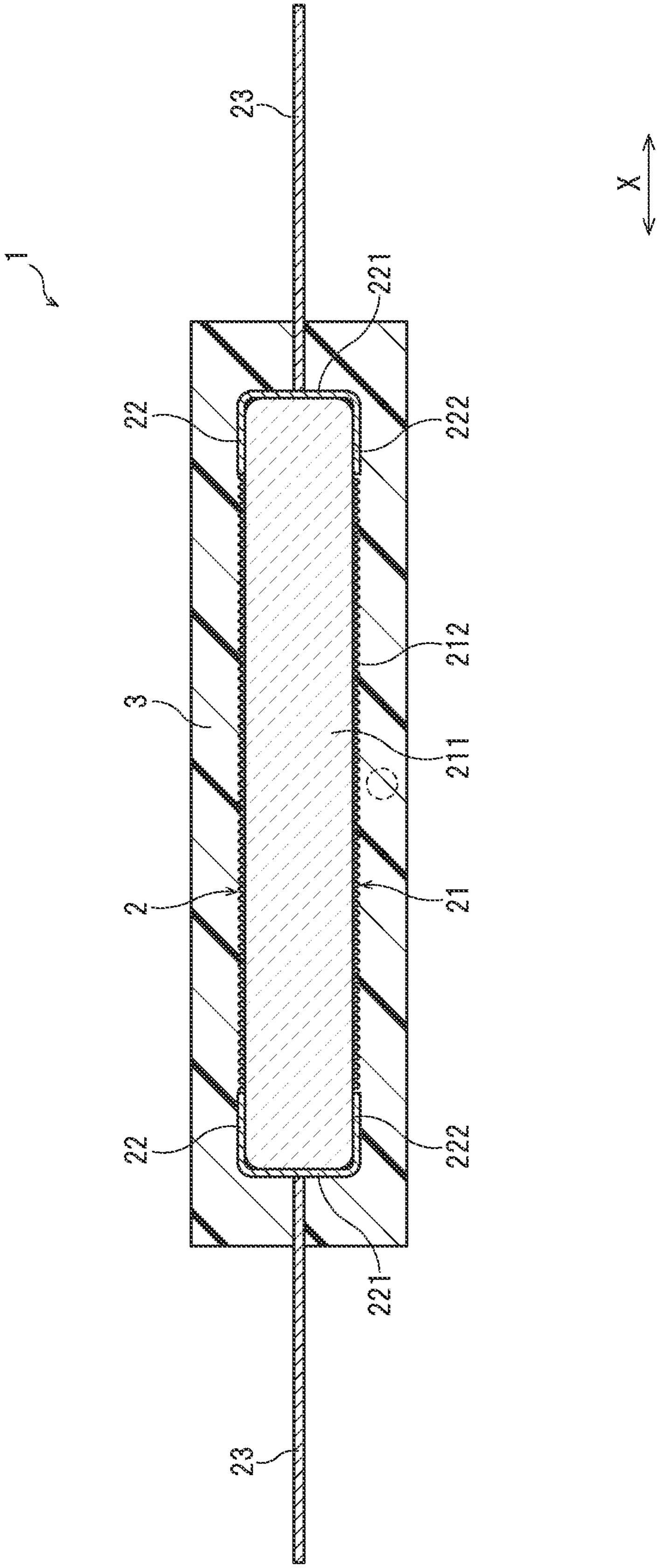
FIG. 2 is a cross-sectional view of the resistor in the first embodiment.

FIG. 1 is a perspective view of a resistor 1 in the present embodiment. FIG. 2 is a cross-sectional view of the resistor 1 in the present embodiment. The resistor 1 has a resistor body part 2 and a molded resin 3 in which the resistor body part 2 is embedded.

In the present embodiment, the resistor body part 2 has a resistive element 21, a pair of cap electrodes 22 mated to both ends of the resistive element 21, and a pair of lead wires 23 connected to the pair of cap electrodes 22 respectively. In the present embodiment, the resistor body part 2 is a so-called winding resistor element. The resistive element 21 has an electrically insulating core material 211 and a winding 212 helically wound around the outer periphery of the core material 211. The core material 211 is made of an electrically insulating material such as, for example, ceramic, formed in a circular cylindrical (hollow) shape. The winding 212 comprises a conductor wire, such as a nichrome wire, for example. In the present embodiment, the resistor body part 2 is a winding resistor. However, it may be a ceramic resistor without a winding 212, such as a conductive ceramic formed in a circular columnar shape, for example.

The cap electrode 22 is made of conductive metal or the like. The cap electrode 22 has a disc-shaped bottom portion 221 at right angles to the longitudinal direction of the resistive element 21 and a circular cylindrical side portion 222 extending from the peripheral rim of the bottom portion 221 to the center of the resistive element 21 in the longitudinal direction of the resistive element 21. The cap electrode 22 has an open side opposite to the bottom portion 221 in the side portion 222. The longitudinal direction of the resistive element 21 may also henceforth be referred to as the element longitudinal direction X. A pair of cap electrodes 22 are mated to both ends of the resistive element 21 in the element longitudinal direction X. The cap electrodes 22 are electrically connected to the winding 212 of the resistive element 21 by electrically contacting the side portion 222 of the cap electrodes 22 with the winding 212 in the mated state with the resistive element 21. In the state where the pair of cap electrodes 22 are mated with the resistive element 21, the cap electrodes 22 may be connected to the winding 212 by welding or other means. A different lead wire 23 is connected to each of the pair of cap electrodes 22.

The lead wires 23 are joined by welding or the like to the side opposite the side of the resistive element 21 at the bottom portion 221 of the cap electrode 22. The lead wire 23 is made of a conductor wire, such as a tinned (Sn-plated) conductor wire, for example.

The molding resin 3 is molded to bury the resistor body part 2 while exposing the respective ends of the pair of lead wires 23. The molding resin 3 is molded in the shape of a rectangular column that is lengthy in the element longitudinal direction X of the device.

Figure 3:
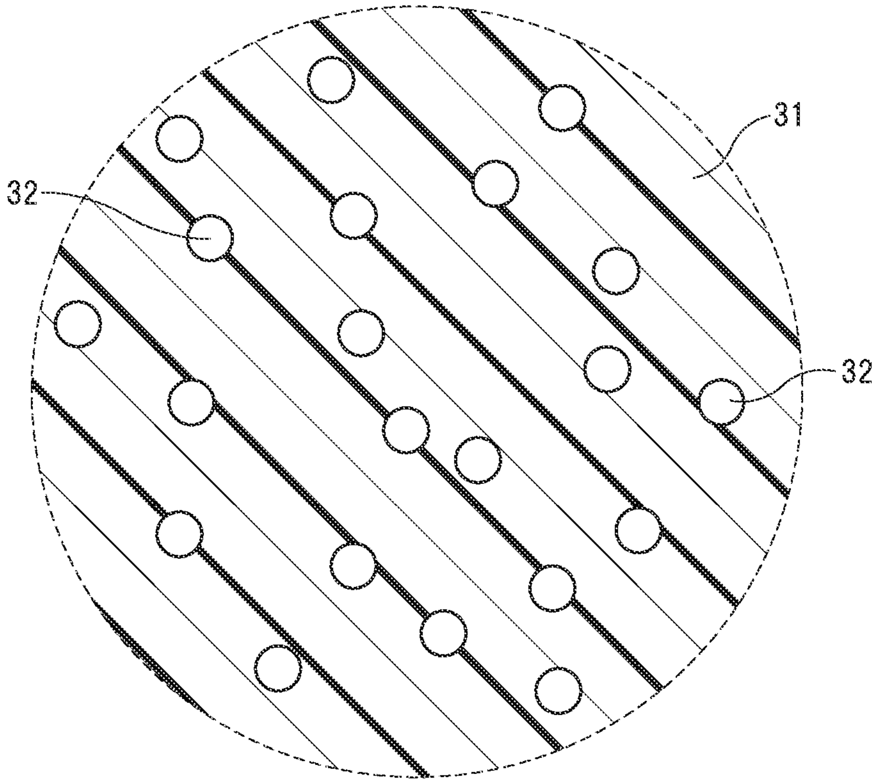
FIG. 3 is an enlarged schematic diagram of the area enclosed by the dashed circle in FIG. 2.

FIG. 3 is an enlarged schematic diagram of the area enclosed by the dashed circle in FIG. 2. As shown in FIG. 3, the molding resin 3 comprises a base resin 31 having electrical insulation properties and a filler 32 having thermal conductivity. The base resin 31 is composed of an electrically insulating resin, such as PPS (polyphenylene sulfide) resin or epoxy resin. The filler 32 can be composed of metal or ceramic powder, more specifically, aluminum oxide, boron nitride, aluminum nitride, or the like. In FIG. 3, the filler 32 is represented as a circular shape for convenience, but the shape of the filler 32 is not limited to this.

By including the thermally conductive filler 32 in the molding resin 3, the thermal conductivity of the entire molding resin 3 is improved and the interior of the resistor 1 is suppressed from becoming hot. In the present embodiment, the thermal conductivity of the molding resin 3 is cement or more, for example, 2 W/(m·K) or more, preferably 3 W/(m·K) or more. The thermal conductivity of the molding resin 3 can also be less than 10 W/(m·K).

A typical cement resistor is configured by filling a case with cement, and the cement is adhered to the case. The resistor 1 in the present embodiment adheres to the molded resin 3 (i.e., resin mold) and there is no case that holds the molded resin 3. This prevents the resistor 1 from becoming larger in size. At the time of use, it is possible to assemble the resistor 1 into a case manufactured separately from the resistor 1. In this case, the resistor 1 is still removably attached to the case, but the resistor 1 itself, which does not have a case, is formed in a smaller size.

Figure 4:
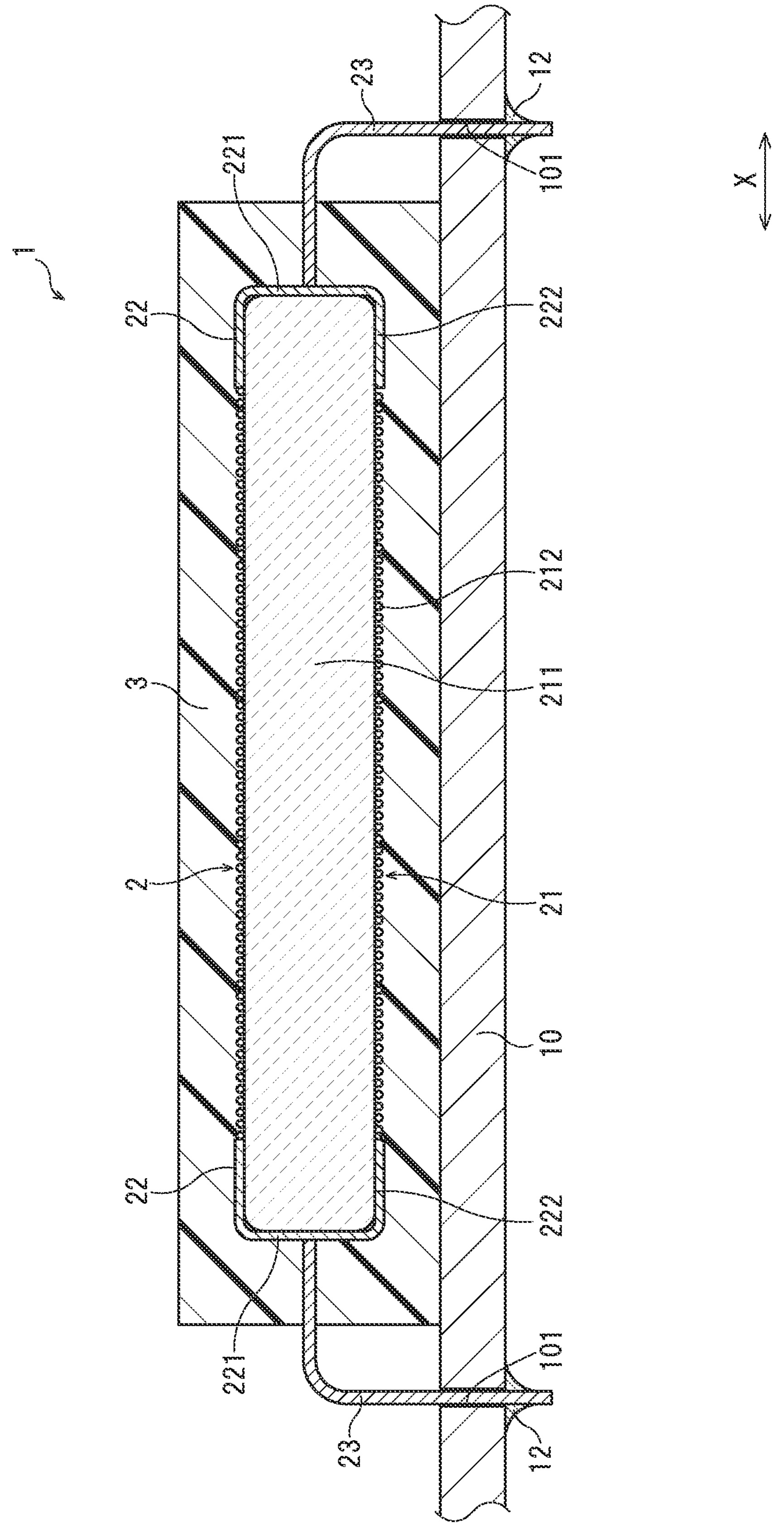
FIG. 4 is a cross-sectional view of the resistor in the first embodiment, showing an example of the state of use.

FIG. 4 shows a cross-sectional view of the resistor 1 in use. The resistor 1 is mounted on a circuit board 10, for example. In this case, the pair of lead wires 23 are bent so that they can be inserted into through holes 101 of the circuit board 10, and are connected to the circuit board 10 using solder 12 or the like. The resistor 1 can be, for example, distributed in the engine compartment of an automobile. In this case, for example, the resistor 1 may be placed in the motor wiring connecting the stator coil of the motor to the terminal block of the motor, and may constitute a snubber circuit to suppress surge voltage. When the resistor 1 is placed in a high temperature environment such as in an engine compartment, the ambient temperature of the resistor 1 is high and high heat dissipation is required for the resistor 1, making the resistor 1 of the present embodiment suitable for use. When the resistor 1 is mounted on the circuit board 10, at least one of the four faces parallel to the element longitudinal direction X in the rectangular columnar molded resin 3 faces the circuit board 10. The heat of the resistor 1 is dissipated through the molded resin 3 to the air around the resistor 1, etc., and is also dissipated from the circuit board 10 through the molded resin 3 or the lead wires 23.

The resistor 1 may be mounted on an attached member other than the circuit board 10. In this case, for example, if the surface of the member to which the resistor 1 is to be attached has a non-planar shape such as a curved surface, the surface of the molded resin 3 that contacts the member to which the resistor 1 is to be attached can be shaped in line with the aforementioned non-planar shape. It is also possible to adopt a shape other than a rectangular column shape for the molded resin 3.

(Manufacturing Method of the Resistor 1)

Figure 5:
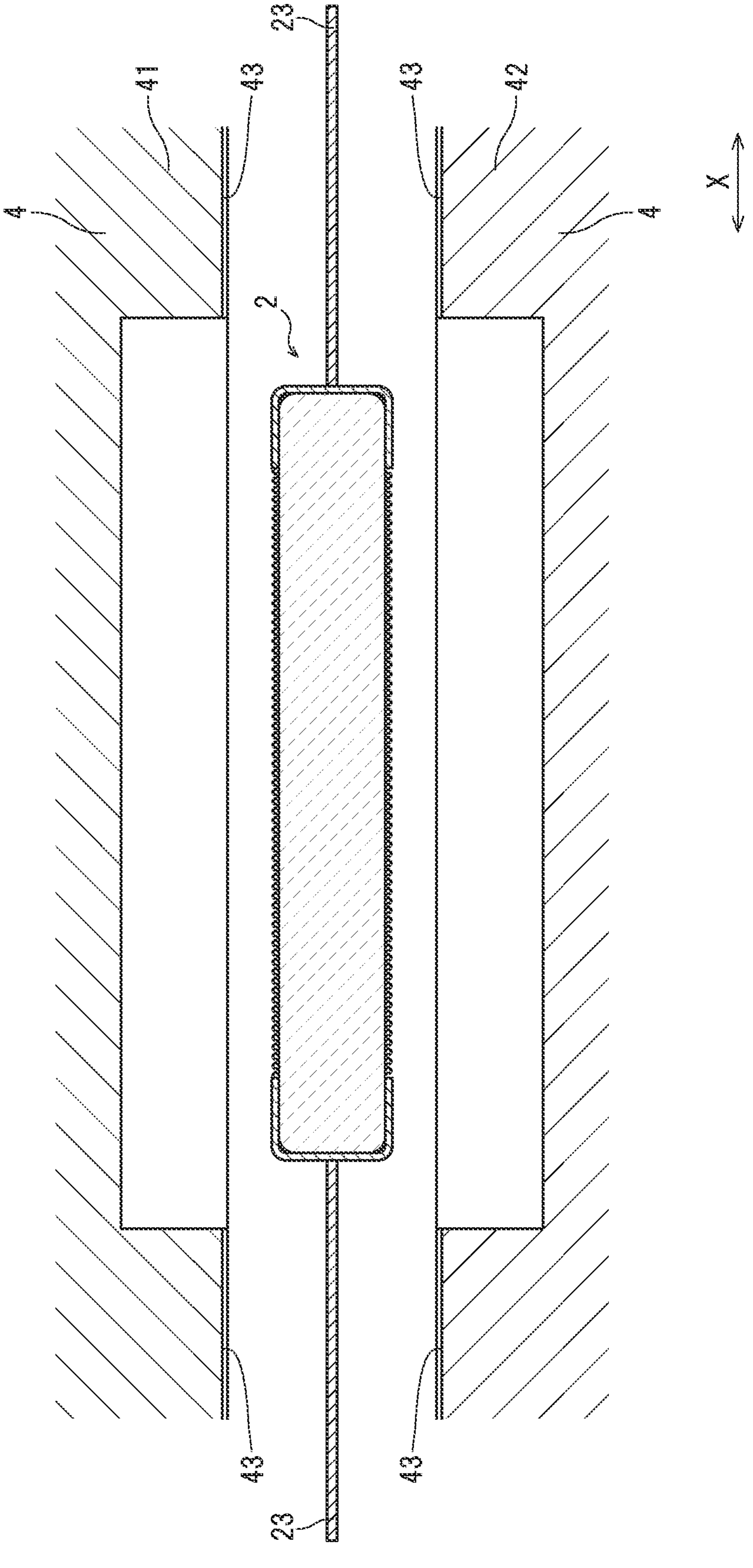
FIG. 5 is a cross-sectional view to explain the manufacturing method of the resistor in the first embodiment, showing a mold and the resistor before mold clamping.
Figure 6:
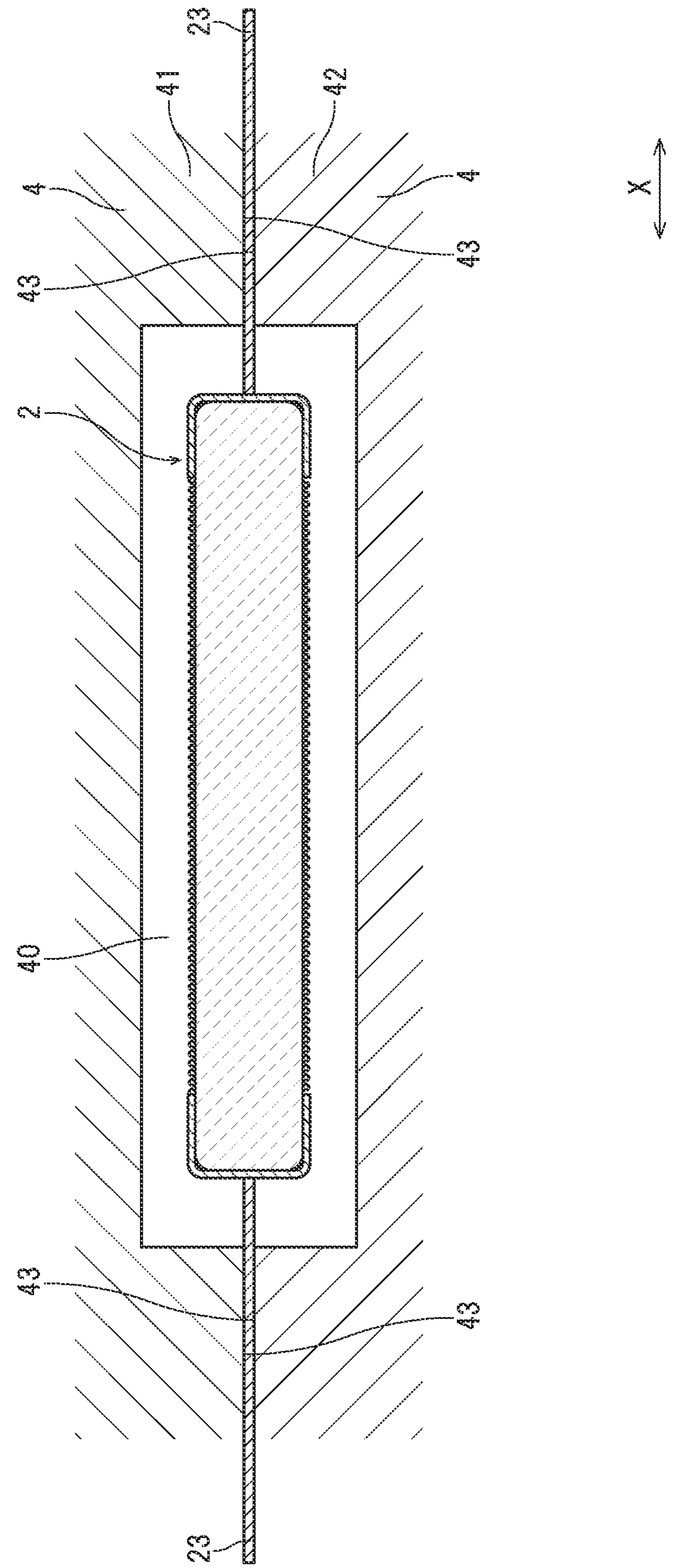
FIG. 6 is a diagram to explain the manufacturing method of the resistor in the first embodiment, and is a cross-sectional view showing the mold and the resistor after mold clamping.
Figure 7:
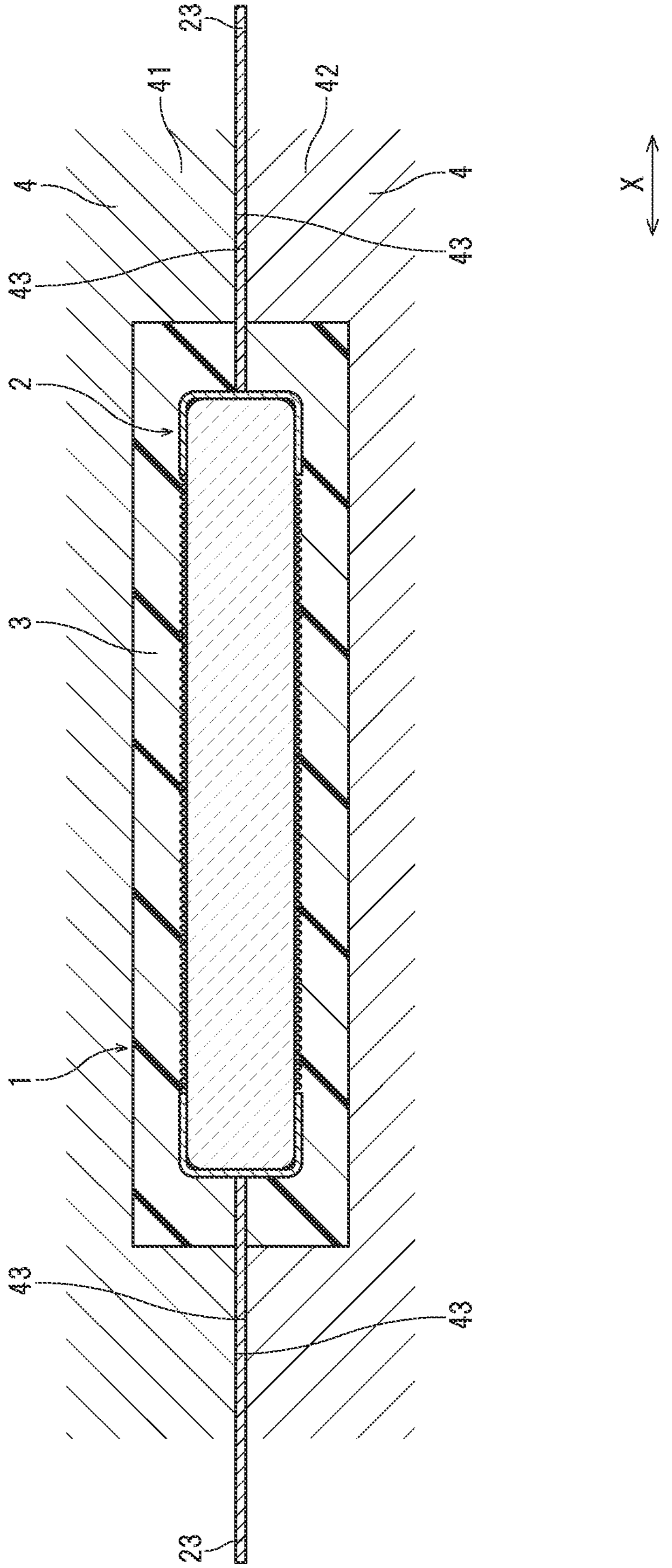
FIG. 7 is a diagram to explain the manufacturing method of the resistor in the first embodiment, and a cross-sectional view showing the state of a molding resin molded in the mold.

Next, an example of the manufacturing method of the resistor 1 is described using FIGS. 5 through 7. FIG. 5 shows a cross-sectional view of the mold 4 and the resistor 1 before mold clamping. FIG. 6 is a cross-sectional view showing the mold 4 and the resistor 1 after mold clamping. FIG. 7 is a cross-sectional view showing the state in which the molding resin 3 is molded in the mold 4.

In manufacturing the resistor 1, the resistor body part 2 is first manufactured. The manufacturing of the resistor body part 2 can be performed in the same way as the manufacturing method of ordinary winding the resistor.

Next, as shown in FIGS. 5 and 6, the resistor body part 2 is set in a mold 4 for molding the molding resin 3. The mold 4 has an upper mold 41 and a lower mold 42 which are aligned in one direction at right angles to the element longitudinal direction X. The upper mold 41 and the lower mold 42 have a pair of lead gripping grooves 43 on their mutually aligned surfaces for placing and gripping a pair of leads. By clamping the upper and lower molds 41 and 42, the pair of lead wires 23 of the resistor body part 2 are gripped in the mold 4.

The raw material (i.e., the molding resin) in a molten state, which becomes the molded resin 3, is injected into the cavity 40 in the mold 4 in which the resistor body part 2 is arranged and cured, so that the molding resin 3 is molded and the resistor 1 is manufactured as shown in FIG. 7. The raw material (i.e., the molding resin) of the molded resin 3 is a molten state resin that will be used as the base resin (see FIG. 3, character 31) with filler (see FIG. 3, character 32) dispersed in the molten state resin. After molding the molding resin 3, the pair of lead wires 23 exposed from the molded resin 3 may be bent to facilitate connecting the resistor 1 to the connection point.

(Functions and Effects of the First Embodiment)

In the present embodiment, the molded resin 3 in which the resistor body part 2 is embedded contains the filler 32, which has a higher thermal conductivity than the base resin 31. Hence, the heat dissipation of the resistor 1 can be improved.

The thermal conductivity of the molded resin 3 is between 3 W/(m·K) and 10 W/(m·K). By setting the thermal conductivity of the molded resin 3 to 3 W/(m·K) or more, the heat dissipation of the resistor 1 can be improved. By setting the thermal conductivity of the molded resin 3 to 10 W/(m·K) or less, it is possible to reduce the cost of the molding resin 3 and improve its moldability. To increase the thermal conductivity of the molded resin 3, it is necessary to include more filler 32. However, the more filler 32 is added, the higher the cost of the molding resin 3 becomes, and the flowability of the raw material (i.e., the molding resin) in a molten state that becomes molded resin 3 becomes poor, and the moldability of molding resin 3 tends to deteriorate. Therefore, by setting the thermal conductivity of the molded resin 3 to 10 W/(m·K) or less, the cost of the molding resin 3 can be reduced and the moldability of the molding resin 3 can be improved.

As described above, according to the present embodiment, it is possible to provide a resistor that can improve heat dissipation and a manufacturing method thereof.

Second Embodiment

Figure 8:
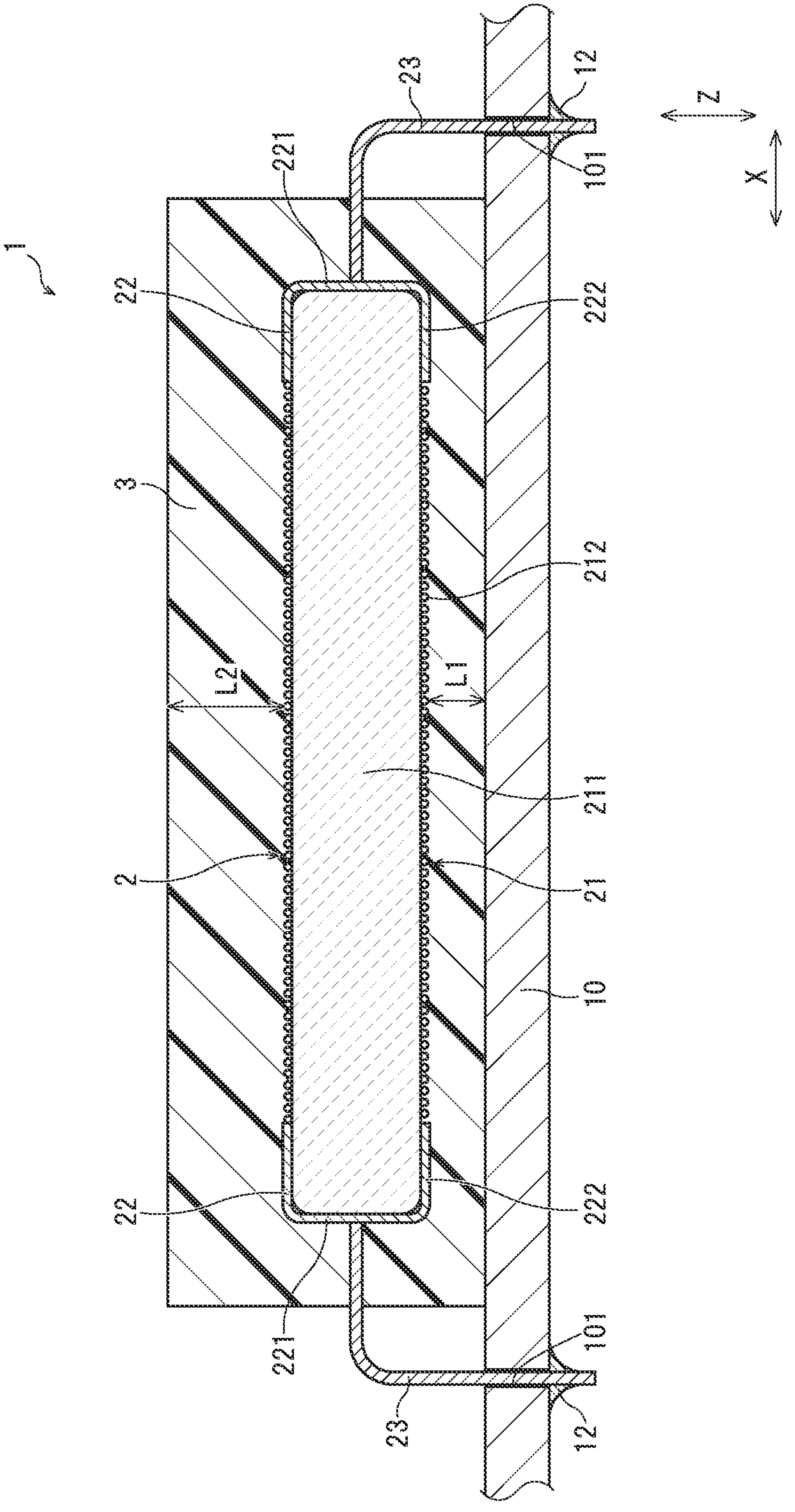
FIG. 8 is a cross-sectional view showing an example of the state of use of a resistor in the second embodiment.

FIG. 8 shows a cross-sectional view of the resistor 1 of the present embodiment in use.

The present embodiment is an embodiment in which the position of the resistor body part 2 within the molded resin 3 is devised. Here, among the outer surface of the molded resin 3, the surface facing the circuit board 10 is a reference surface 30, and the direction at right angles to the reference surface 30 is the vertical direction Z. The side facing the reference surface 30 is the bottom side, and the opposite side is the top side. The expression "up and down" is for convenience and does not limit the posture of the resistor 1 with respect to the vertical direction, for example, in the state of use of the resistor 1. In the vertical direction Z, the length L1 from the reference surface 30 to the bottom position of the resistive element 21 is shorter than the length L2 from the top surface of the molded resin 3 to the top position of the resistive element 21. The respective tips of the pair of lead wires 23 are bent downward and connected to a connection point such as through-hole 101 of the circuit board 10.

The other configuration of the present embodiment is the same as that of the first embodiment. The same characters used in the second and subsequent embodiments as those used in the previous embodiments represent the same components, etc., as in the previous embodiments, unless otherwise indicated.

(Functions and Effects of the Second Embodiment)

In the present embodiment, the distance from the resistive element 21 to the resistor 1 mounting member such as circuit board 10 through the molded resin 3 can be shortened, so the heat transfer distance from the resistive element 21 to the mounting member is also shortened. Therefore, heat dissipation from the resistive element 21 to the attached member is improved. Other functions and effects are the same as those of the first embodiment.

Third Embodiment

Figure 9:
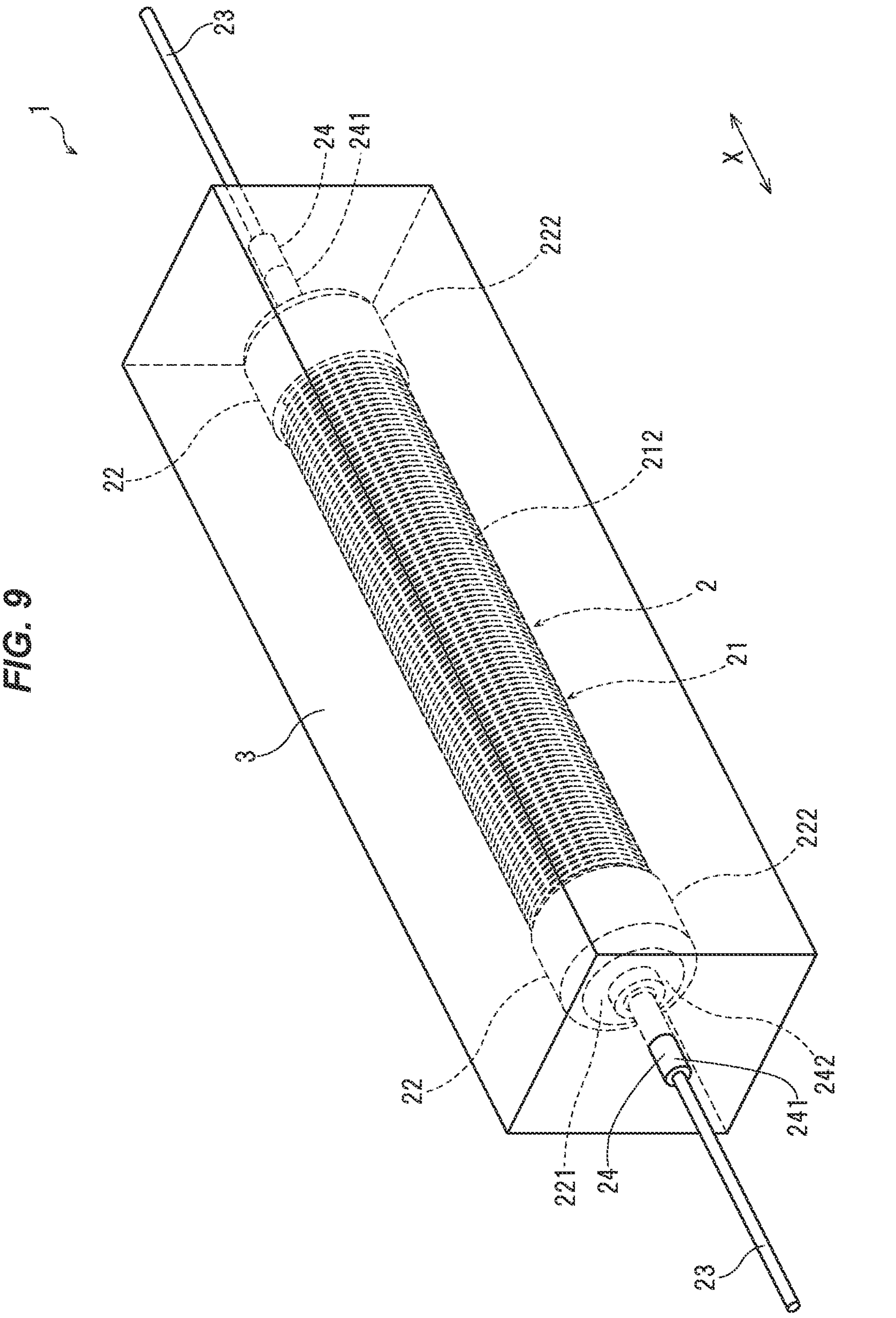
FIG. 9 is a perspective view of a resistor in the third embodiment.
Figure 10:
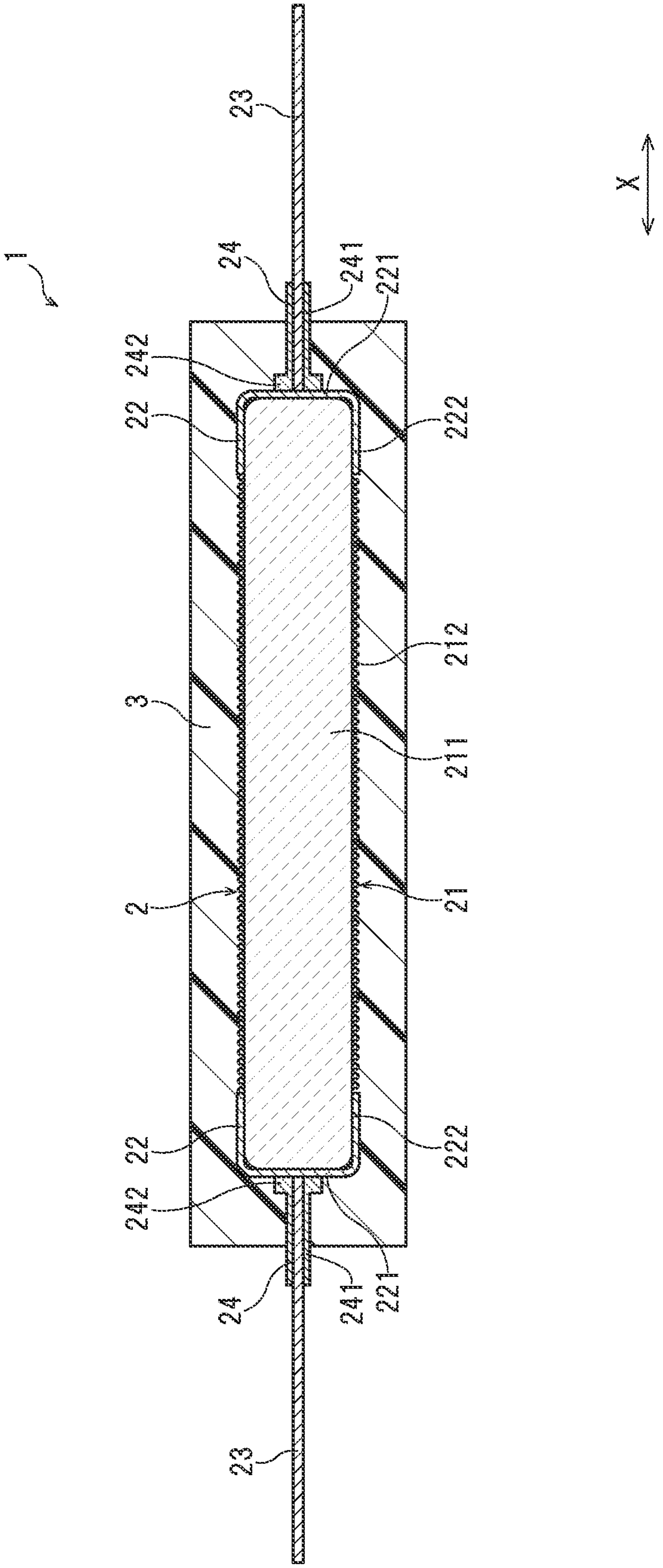
FIG. 10 is a cross-sectional view of the resistor in the third embodiment.

FIG. 9 is a perspective view of the resistor 1 in the present embodiment. FIG. 10 is a cross-sectional view of the resistor 1 in the present embodiment.

(Resistor 1)

In the present embodiment, the resistor body part 2 has a pair of sleeve members 24. The pair of sleeve members 24 are each formed in an abbreviated circular cylindrical shape and are arranged to insert different lead wires 23 into each other. The pair of sleeve members 24 have a shape symmetrical in the element longitudinal direction X with respect to each other.

The sleeve member 24 has a small-diameter portion 241 formed in a circular cylindrical shape and a large-diameter portion 242 protruding more peripherally than the small-diameter portion 241 at the end of the small-diameter portion 241 that is closer to the cap electrode 22. The sleeve member 24 abuts the bottom portion 221 of the cap electrode 22 at the large-diameter portion 242, and the large-diameter portion 242 and the cap electrode 22 are joined by welding or other means. In the present embodiment, the sleeve member 24, which is separate from the cap electrode 22, is joined to the bottom portion 221 of the cap electrode 22. However, this is not limited to this configuration, and the sleeve member 24 may be integrally formed with the cap electrode 22.

In the present embodiment, the sleeve member 24 is formed to be more rigid than the lead wire 23. The sleeve member 24 is made of a metal, alloy, resin, or the like that is more rigid than the lead wire 23. For example, the sleeve member 24 is made of phosphor bronze with a tin-plated surface. Although not shown in the figure, the sleeve member 24 may be configured so that its minimum thickness is larger than the diameter of the lead wire 23. In the configuration of the sleeve member 24 of the present embodiment, the minimum thickness of the sleeve member 24 is the thickness of the small-diameter portion 241 of the sleeve member 24.

The sleeve member 24 has the portion on the cap electrode 22-side embedded in the molded resin 3 and the portion on the anti-cap electrode 22-side (i.e., the opposite side to the cap electrode 22-side) exposed from the molded resin 3. In the present embodiment, only a portion of the small-diameter portion 241 of the sleeve member 24 is exposed from the molded resin 3. For example, a configuration in which the entire sleeve member 24 is exposed may be adopted. Otherwise, it is the same as in the first embodiment.

(Method of Manufacturing the Resistor 1)

Figure 11:
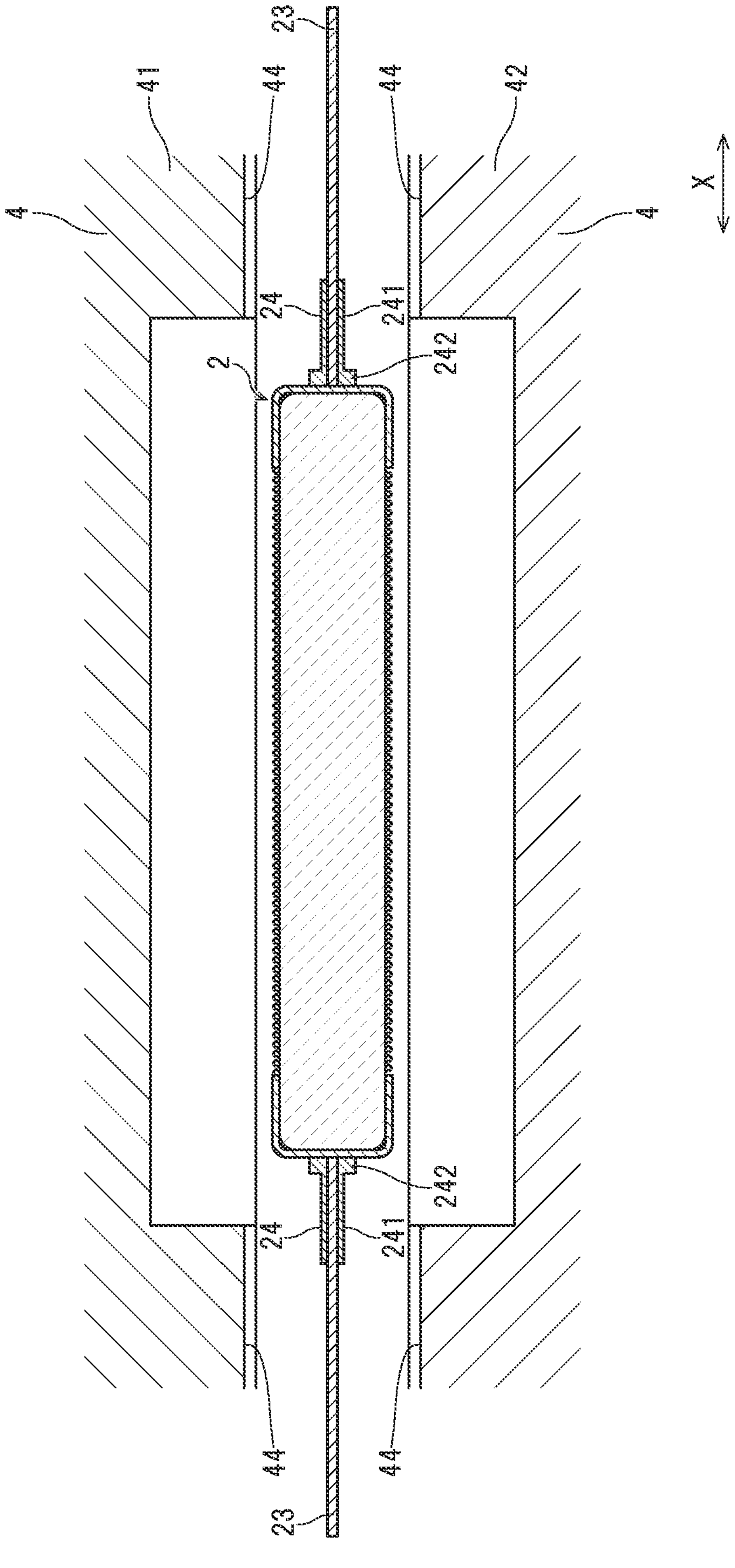
FIG. 11 is a cross-sectional view of the resistor and the mold before mold clamping to explain the manufacturing method of the resistor in the third embodiment.
Figure 12:
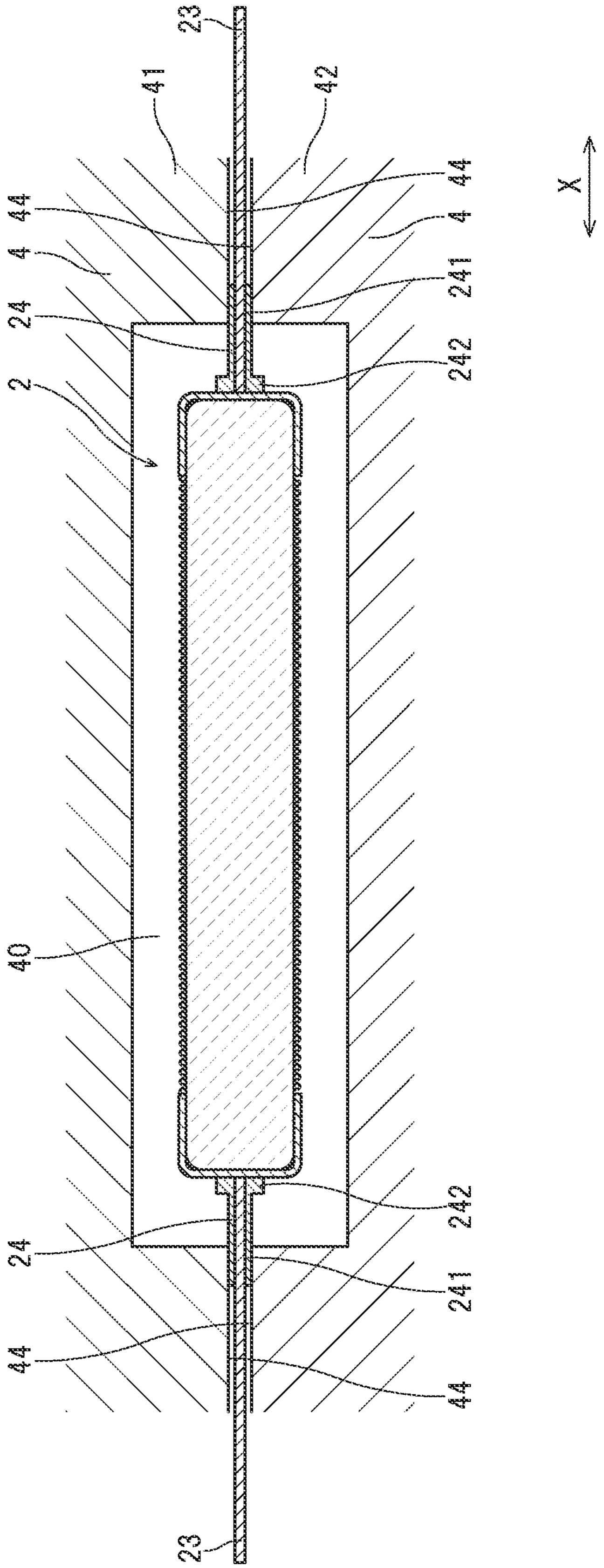
FIG. 12 is a diagram to explain the manufacturing method of the resistor in the third embodiment, and is a cross-sectional view showing the mold and the resistor after mold clamping.

Next, an example of the manufacturing method of the resistor 1 of the present embodiment is described using FIGS. 11 and 12. FIG. 11 shows a cross-sectional view of the mold 4 and the resistor 1 before mold clamping. FIG. 12 is a cross-sectional view of the mold 4 and the resistor 1 after mold clamping.

First, the resistor body part 2 is manufactured except for the sleeve member 24. Then, the lead wire 23 is inserted into the sleeve member 24, and the large-diameter portion 242 of the sleeve member 24 is brought into contact with the bottom portion 221 of the cap electrode 22. The sleeve member 24 and cap electrode 22 are then joined by welding or other means. As a result, the resistor body part 2 is obtained.

Next, the resistor body part 2 is set in the mold 4 as shown in FIGS. 11 and 12. The mold 4 has an upper mold 41 and a lower mold 42 that are aligned in one direction perpendicular to the element longitudinal direction X. The upper mold 41 and the lower mold 42 have a pair of sleeve gripping grooves 44 for placing and gripping a pair of sleeve members 24 on their mutually aligned surfaces. By clamping the upper and lower molds 41 and 42, the pair of sleeve members 24 of the resistor body part 2 are gripped in the mold 4.

The raw material (i.e., the molding resin) in a molten state, which becomes the molded resin 3, is injected into the cavity 40 in the mold 4 in which the resistor body part 2 is arranged and cured, thereby molding the molding resin 3 and producing the resistor 1.

In the present embodiment, the sleeve member 24 and the cap electrode 22 are shown as examples welded to each other, but they may not be welded to each other. In this case, in the resistor body part 2 in the state before being molded, the sleeve member 24 is movable with respect to the lead wire 23, but when the pair of sleeve members 24 of the resistor body part 2 is gripped by the upper mold 41 and lower mold 42, the sleeve member 24 is not movable with respect to the lead wire 23. Then, when the molding resin 3 is molded, the sleeve members 24 are integrated with the molded resin 3. The rest of the process is the same as in the first embodiment.

(Functions and Effects of the Third Embodiment)

The resistor 1 of the present embodiment has a pair of sleeve members 24, and a part of each of the pair of sleeve members 24 is exposed from the molded resin 3. Therefore, the sleeve members 24 can protect the lead wires 23 exposed from the molded resin 3. Also, when molding the molding resin 3, it is possible to mold the molding resin 3 while gripping the sleeve members 24 with the mold 4 for molding the molding resin 3. Here, when the lead wire 23 is gripped by the mold 4, the lead wire 23 may be deformed if the rigidity of the lead wire 23 is low. On the other hand, according to the present embodiment, it is possible to grip a pair of sleeve members 24 with the mold 4, so that deformation of a pair of lead wires 23 can be suppressed during mold clamping of the mold 4. Other functions and effects are the same as those of the first embodiment.

Embodiment 4

Figure 13:
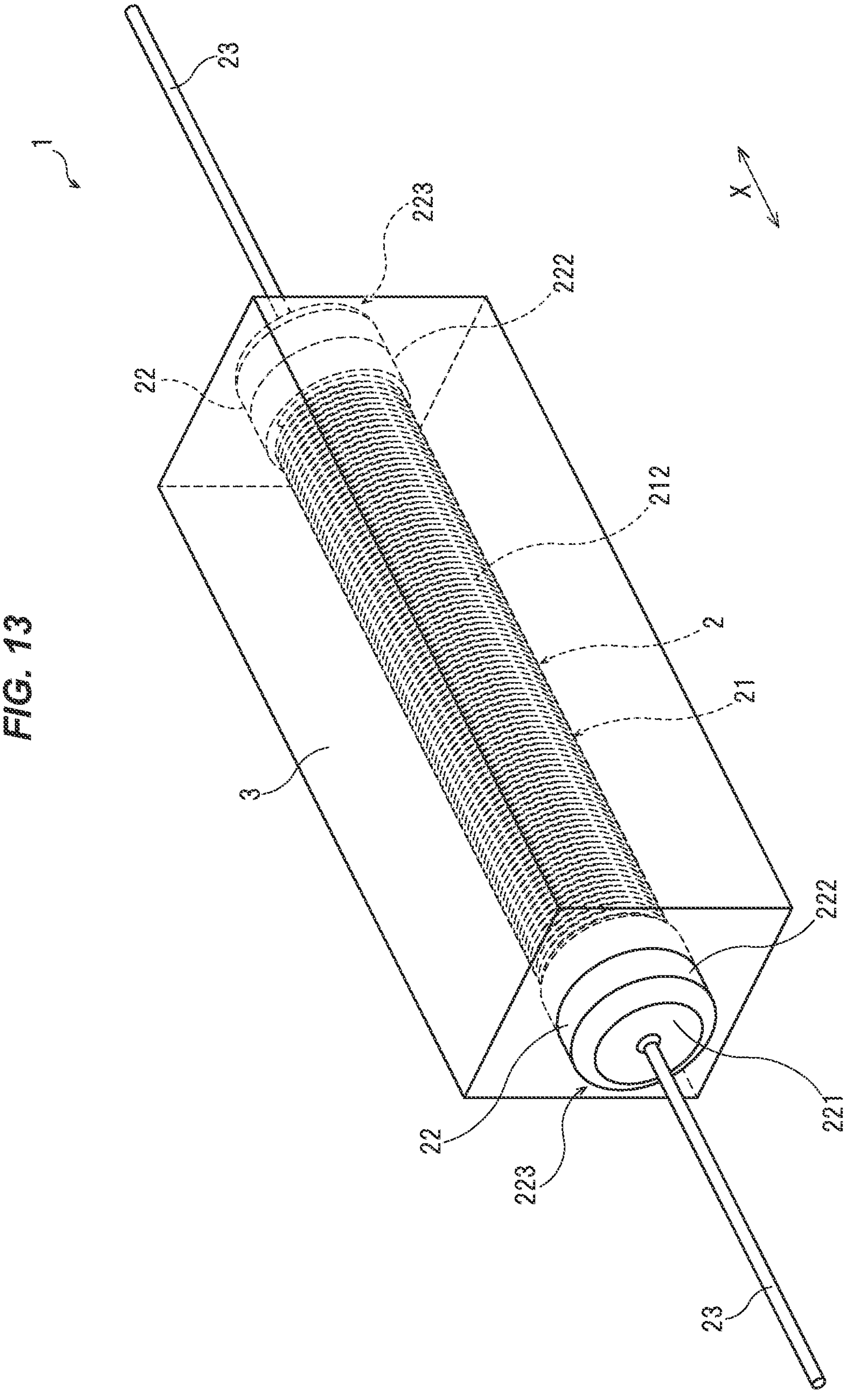
FIG. 13 is a perspective view of a resistor in the fourth embodiment.
Figure 14:
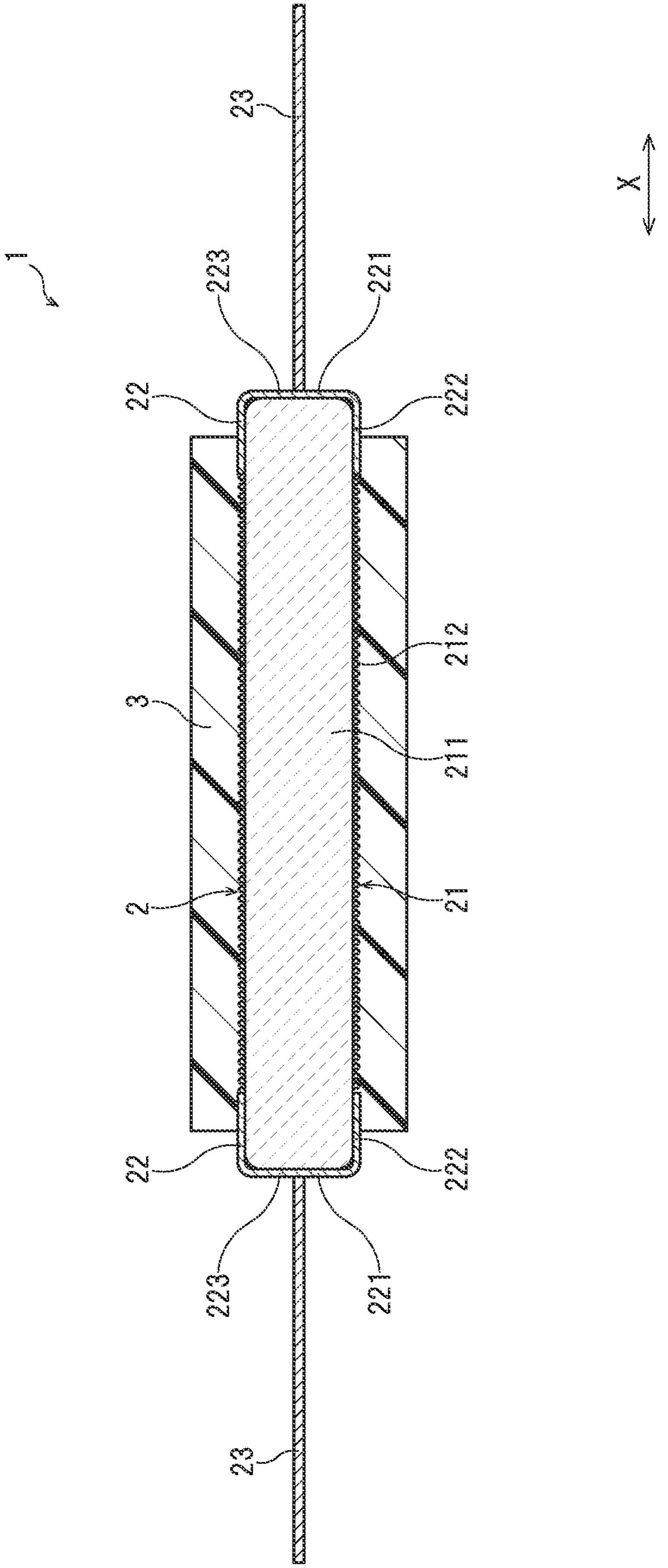
FIG. 14 is a cross-sectional view of the resistor in the fourth embodiment.

FIG. 13 is a perspective view of the resistor 1 in the present embodiment. FIG. 14 is a cross-sectional view of the resistor 1 in the present embodiment.

(Resistor 1)

The present embodiment is an embodiment in which a portion of each of the pair of cap electrodes 22 constitutes a cap exposed portion 223 exposed from the molded resin 3. In the present embodiment, only the ends of the pair of cap electrodes 22 that are far from each other constitute the cap exposed portion 223, and the other portions are buried in the molded resin 3. The cap exposed portion 223 is composed of the bottom portion 221 and the portion on the bottom portion 22-side in the side portion 222. Although not limited to this, for example, the entire cap electrode 22 may form the cap exposed portion 223, the resistive element 21 is preferably protected by being covered by the molded resin 3. Otherwise, it is the same as in the first embodiment.

(Manufacturing Method of the Resistor 1)

Figure 15:
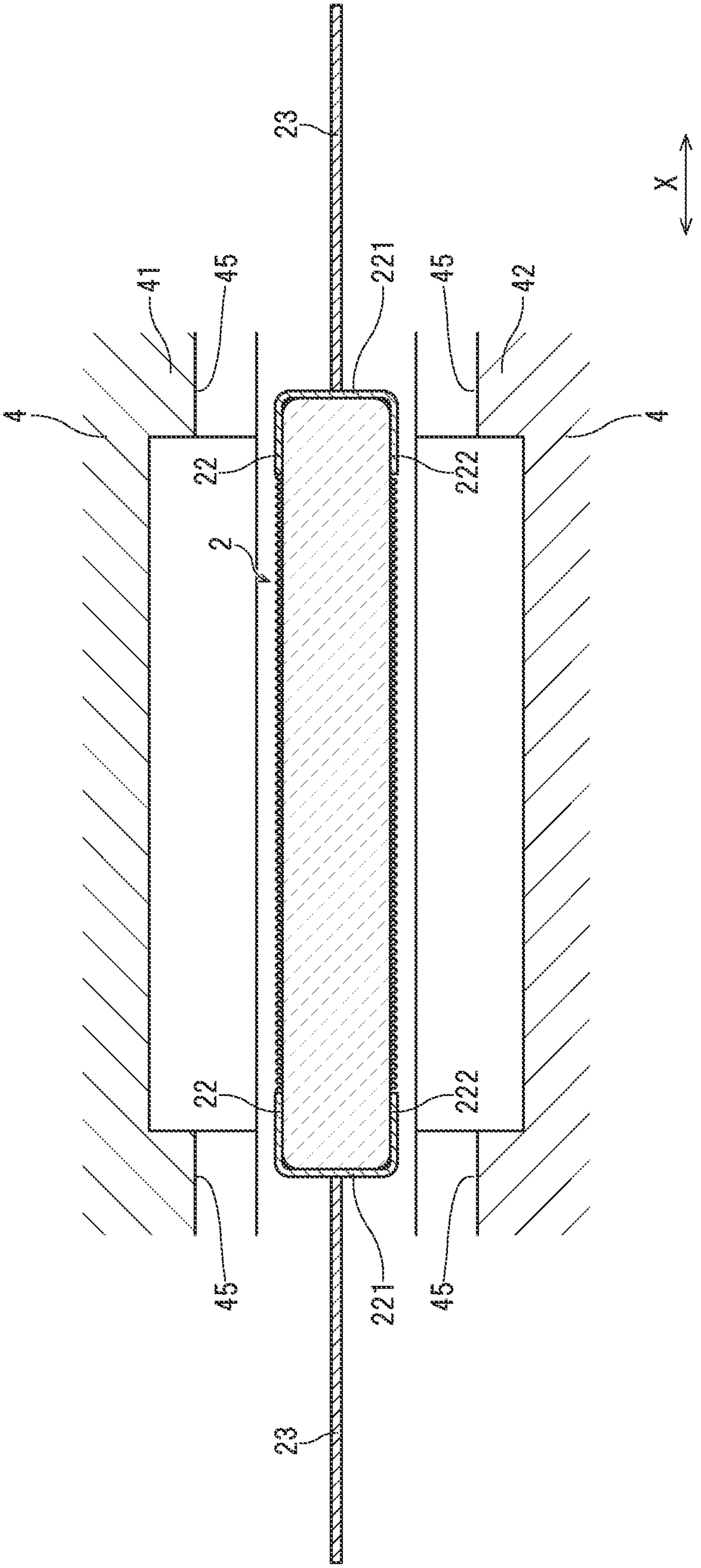
FIG. 15 is a cross-sectional view of the resistor and the mold before mold clamping to explain the manufacturing method of the resistor in the fourth embodiment.
Figure 16:
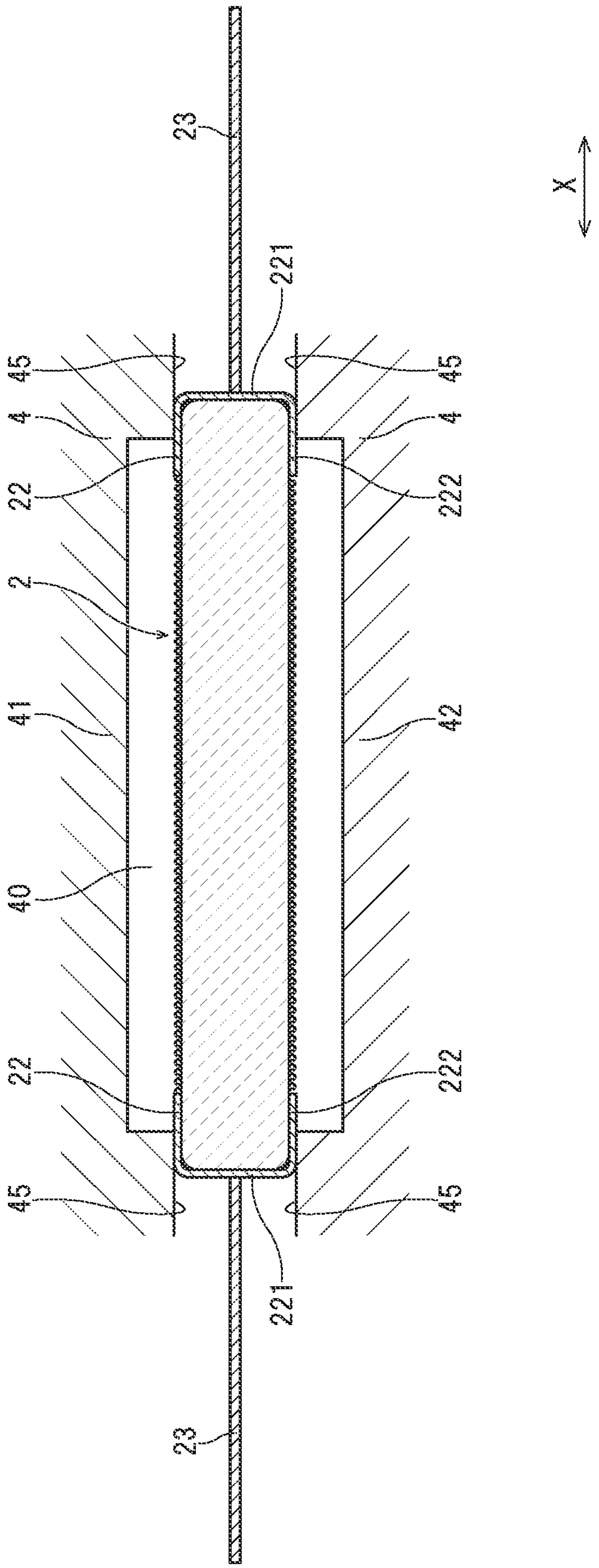
FIG. 16 is a diagram to explain the manufacturing method of the resistor in the fourth embodiment, and is a cross-sectional view showing the mold and the resistor after mold clamping.

Next, an example of the manufacturing method of the resistor 1 of the present embodiment is described using FIGS. 15 and 16. FIG. 15 shows a cross-sectional view of the mold 4 and the resistor 1 before mold clamping. FIG. 16 is a cross-sectional view of the mold 4 and the resistor 1 after mold clamping.

First, the resistor body part 2 is manufactured. Next, the resistor body part 2 is set in the mold 4 for molding the molding resin 3, as shown in FIGS. 15 and 16. The mold 4 has an upper mold 41 and a lower mold 42 which are aligned in one direction at right angles to the element longitudinal direction X. The upper mold 41 and the lower mold 42 have a pair of cap gripping grooves 45 for placing and gripping a pair of cap electrodes 22 on their mutually aligned surfaces. By clamping the upper and lower molds 41 and 42, the pair of cap electrodes 22 of the resistor body part 2 are gripped in the mold 4.

Then, the raw material (i.e., the molding resin) in a molten state, which becomes the molded resin 3, is injected into the cavity 40 in the mold 4 in which the resistor body part 2 is arranged and cured to form the molded resin 3, and the resistor 1 is manufactured. The rest of the process is the same as in the first embodiment.

(Functions and Effects of the Fourth Embodiment)

In the present embodiment, at least a portion of each of the pair of cap electrodes 22 is exposed from the molded resin 3. This makes it easier to reduce the amount of molding resin 3 used, thereby reducing the overall weight and size of the resistor 1. It is also possible to mold the molding resin 3 while gripping the pair of cap electrodes 22 with the mold 4 for molding the molding resin 3. Hence, it is possible to suppress deformation of the pair of lead wires 23 during mold clamping of the mold 4.

The pair of cap electrodes 22 have only a portion of each exposed from the molded resin 3. That is, each of the pair of cap electrodes 22 has a portion buried in the molded resin 3 and a portion exposed from the molded resin 3. Therefore, it is possible to grip a pair of cap electrodes 22 with the mold 4 as described above, and by burying a part of the cap electrodes 22 in the molded resin 3, heat can be diffused from the cap electrodes 22 to the molded resin 3, thereby improving the heat dissipation of the entire resistor 1. Other functions and effects are the same as those of the first embodiment.

Fifth Embodiment

Figure 17:
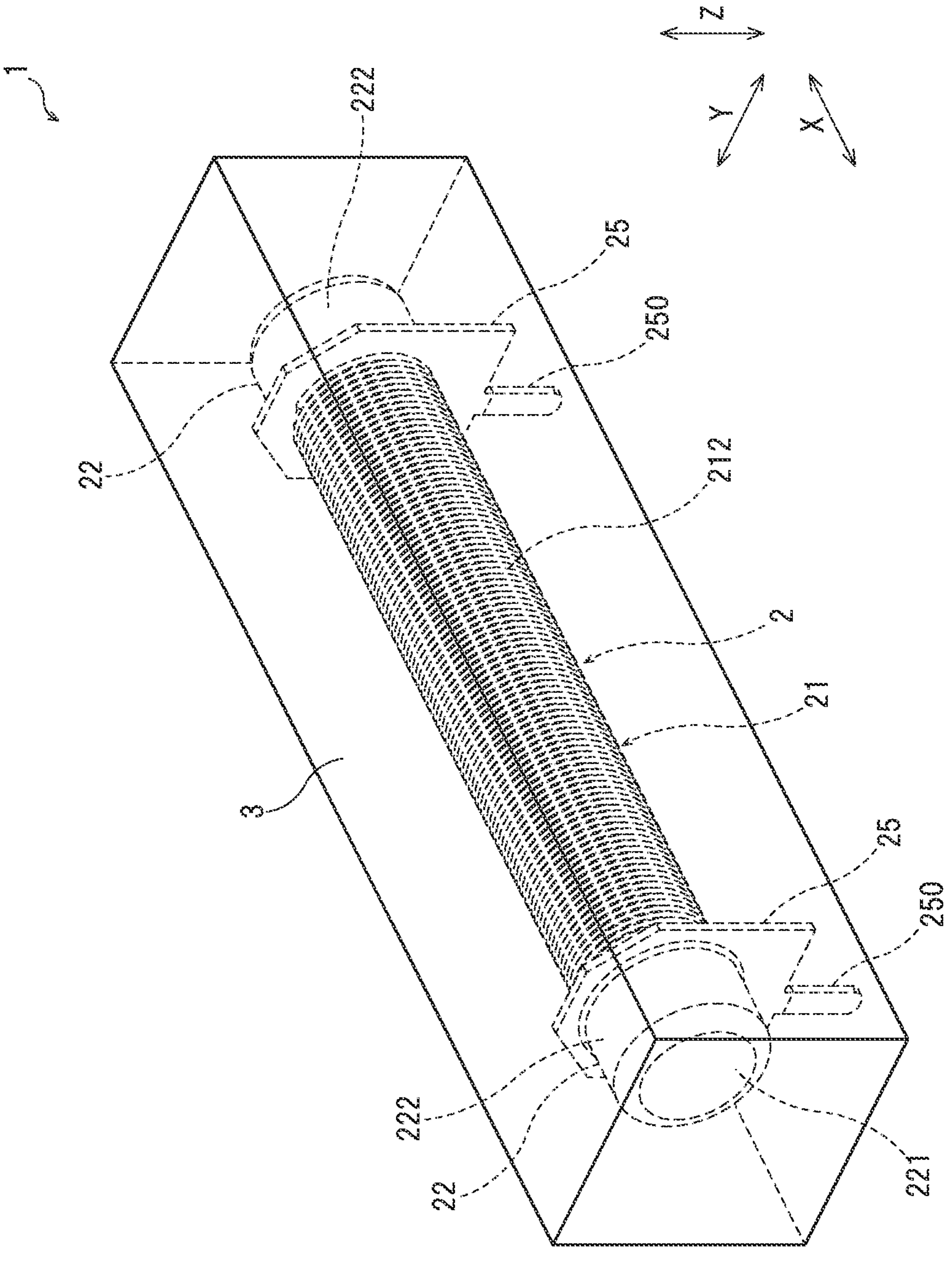
FIG. 17 is a perspective view of a resistor in the fifth embodiment.
Figure 18:
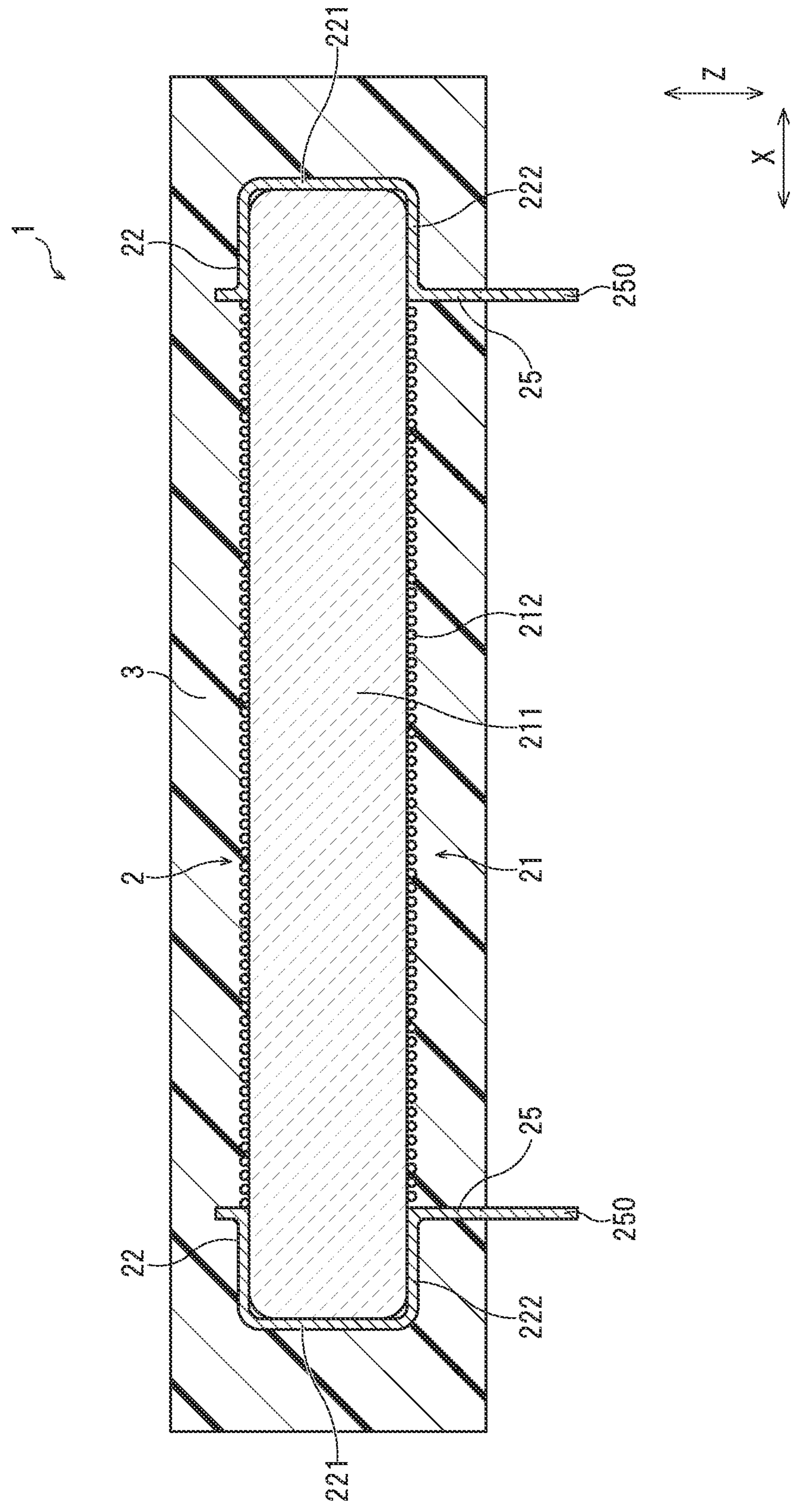
FIG. 18 is a cross-sectional view of the resistor in the fifth embodiment.

FIG. 17 is a perspective view of the resistor 1 in the present embodiment. FIG. 18 is a cross-sectional view of the resistor 1 in the present embodiment.

(Resistor 1)

The present embodiment is equipped with plate terminals 25. In the present embodiment, a pair of plate terminals 25 connected to each of a pair of cap electrodes 22 are provided. Unlike the first embodiment, the resistor 1 of the present embodiment is not provided with lead wires (see character 23 in FIGS. 1 and 2).

The plate terminal 25 is made of a conductor such as a metal, alloy, or the like having a higher thermal conductivity than the molded resin 3. The plate terminals 25 are formed in a plate shape at right angles to the element longitudinal direction X and are connected to the open end of the side portion 222 in the cap electrode 22. The pair of plate terminals 25 are formed to have the same shape. In the present embodiment, the plate terminals 25 are integrally formed with the cap electrode 22. For example, by pressing a single plate, the cap electrode 22 and the plate terminal 25 can be formed simultaneously. Not limited to this, the plate terminal 25 and the cap electrode 22 may be constructed separately. In this case, the plate terminal 25 and the cap electrode 22 may be connected by welding, for example.

The plate terminal 25 has a protrusion 250 protruding in the vertical direction Z at right angles to the element longitudinal direction X. In the present embodiment, the direction at right angles to both the element longitudinal direction X and the vertical direction Z is referred to as the transverse direction Y. The side in the plate terminal 25 on which the protrusion 250 protrudes is referred to as the lower side, and the opposite side is referred to as the upper side. The expressions of up and down are for convenience and do not limit the posture of the resistor 1 with respect to the vertical direction, for example, in the state of use of the resistor 1. The protrusion 250 has a width in the transverse direction Y smaller than the width of the first terminal section in the transverse direction and extends downward from the center of the first terminal section in the transverse direction Y. The plate terminal 25 has the entire first terminal portion and the upper end of the protrusion 250 distributed within the molded resin 3, with most of the protrusion 250 exposed from the molded resin 3. The resistor 1 is electrically connected to a circuit board or the like at the protrusions 250 of the pair of plate terminals 25 exposed from the molded resin 3. The rest is the same as in the first embodiment.

(Method of Manufacturing the Resistor 1)

Figure 19:
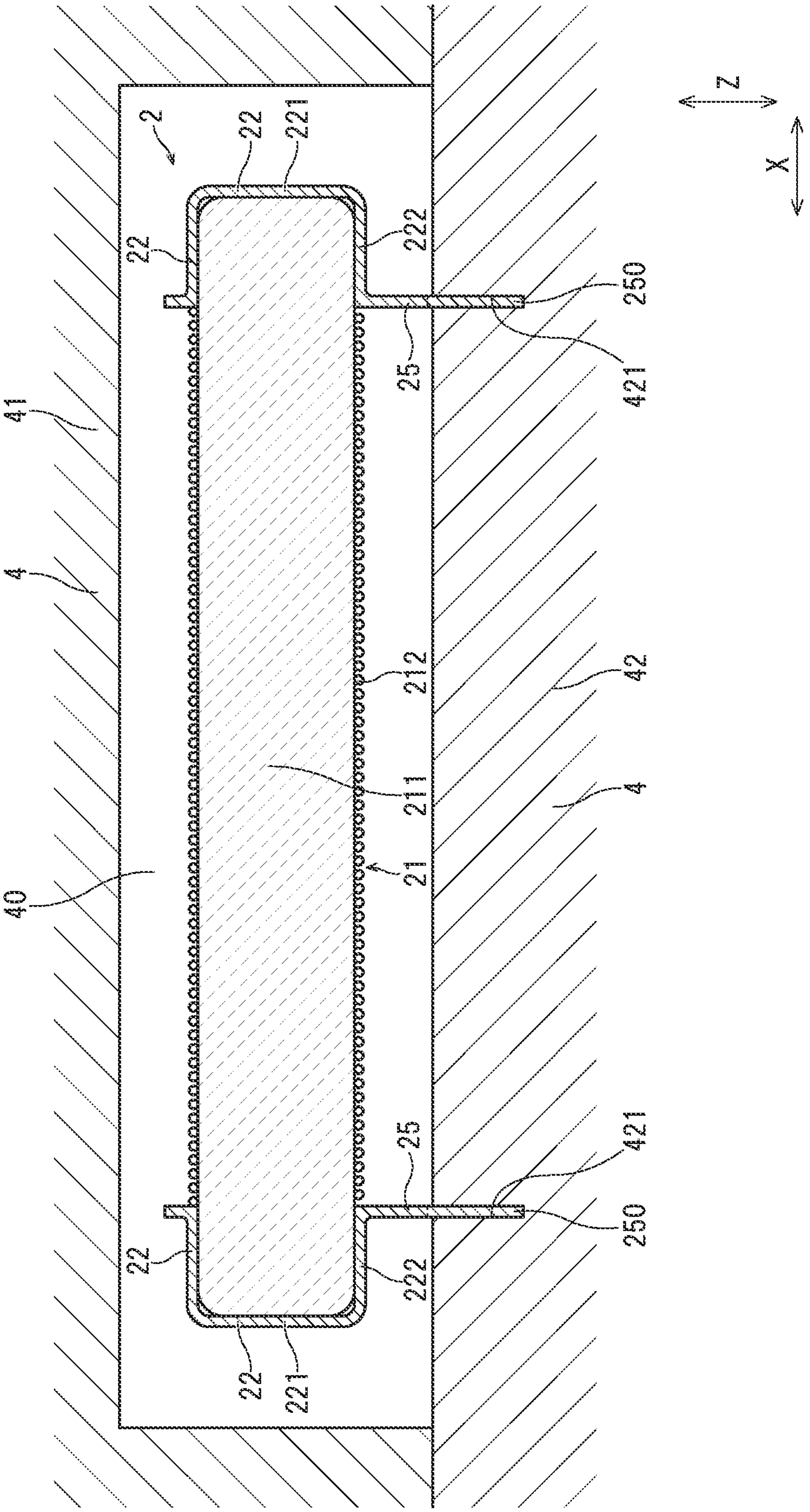
FIG. 19 is a cross-sectional view of the resistor in the fifth embodiment, showing the mold and the resistor after mold clamping.

Next, an example of the manufacturing method of the resistor 1 of the present embodiment is described using FIG. 19. FIG. 19 shows a cross-sectional view of the mold 4 and the resistor 1 after mold clamping.

First, the resistor body part 2 is manufactured. Next, the resistor body part 2 is set in the mold 4 for molding the molding resin 3. The mold 4 has an upper mold 41 and a lower mold 42 which are aligned in the vertical direction Z. The lower mold 42 is located on the lower side of the resistor body part 2 and is provided with an insertion hole 421 for inserting the protrusion 250. The resistor body part 2 is positioned with respect to the upper and lower molds 41 and 42, which are clamped by inserting the protrusions 250 of the pair of plate terminals 25 into the pair of insertion holes 421.

The raw material (i.e., the molding resin) in a molten state, which becomes the molded resin 3, is injected into the cavity 40 in the mold 4 in which the resistor body part 2 is arranged and cured to form the molded resin 3, and the resistor 1 is manufactured. The rest of the process is the same as in the first embodiment.

(Functions and Effects of the Fifth Embodiment)

In the present embodiment, at least a portion of each of the pair of plate terminals 25 is exposed from the molded resin 3. By exposing the plate terminals 25, which are relatively easy to secure rigidity, from the molded resin 3, unintentional deformation of the plate terminals 25 exposed from the molded resin 3 can be suppressed. Also, when molding the molding resin 3, it is possible to mold the molding resin 3 while gripping the plate terminals 25, whose rigidity is relatively easy to secure, with the mold 4 for molding the molding resin 3. Other functions and effects are the same as those of the first embodiment.

Embodiment 6

Figure 20:
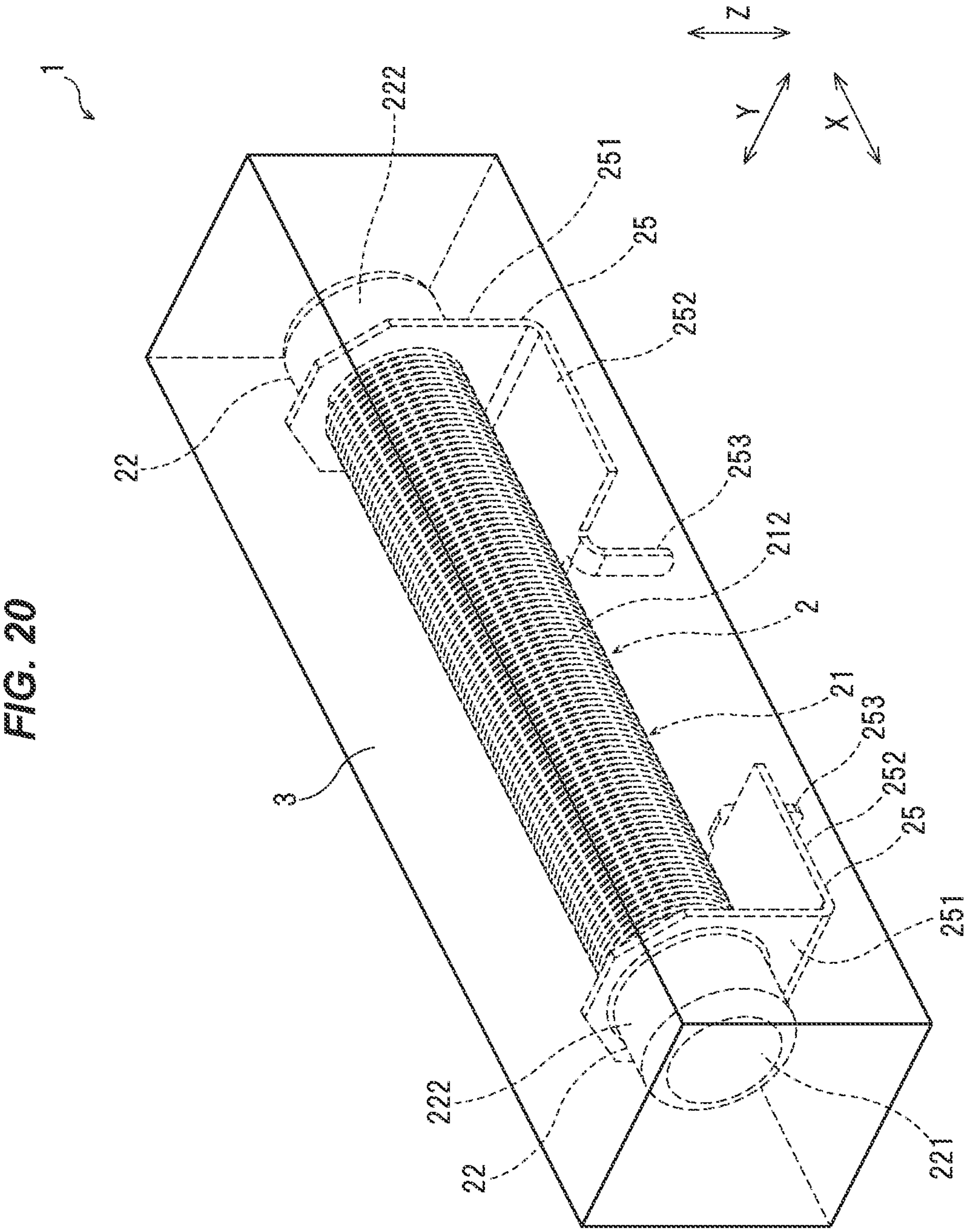
FIG. 20 is a perspective view of a resistor in the sixth embodiment.
Figure 21:
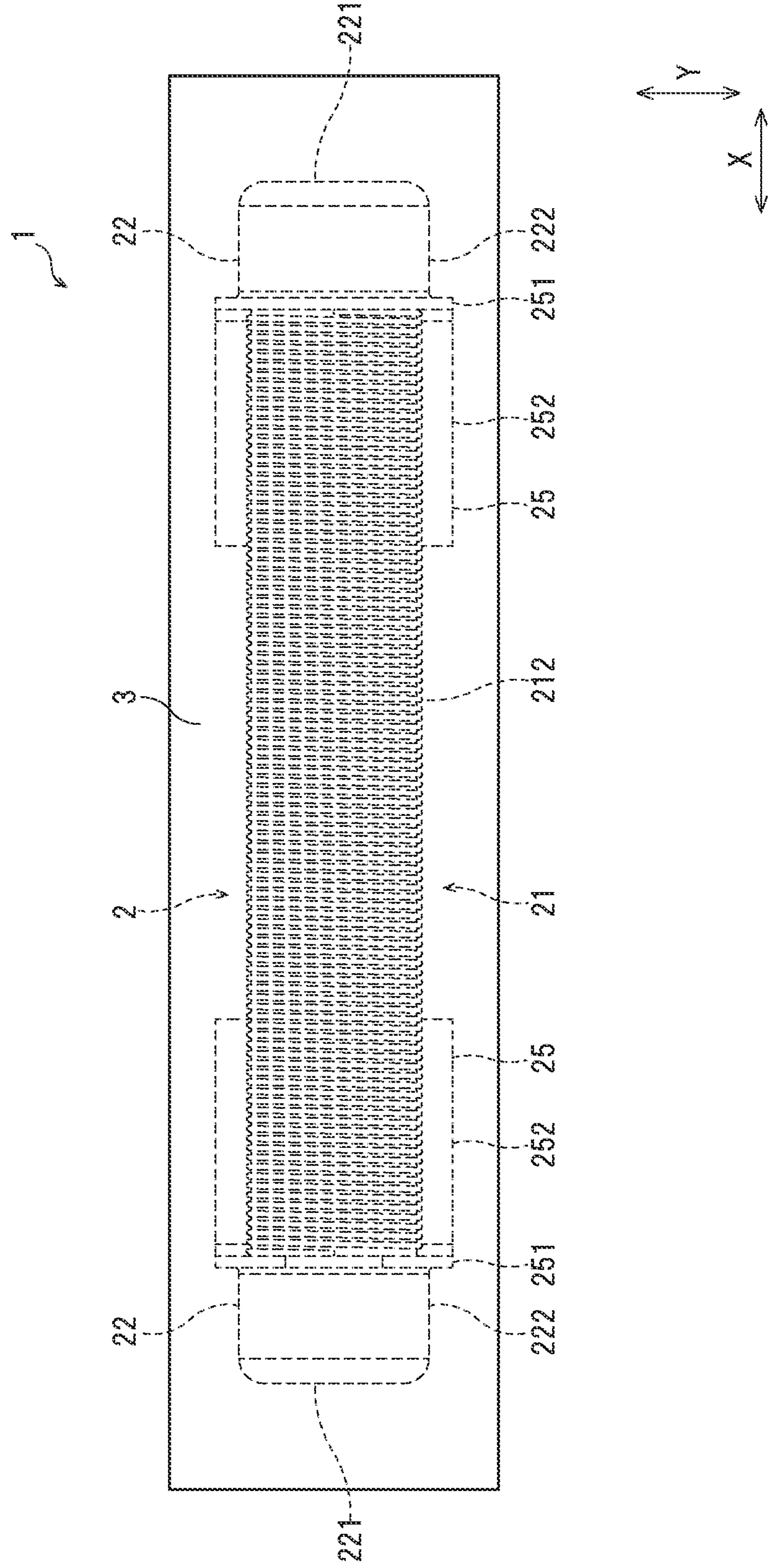
FIG. 21 is a plan view of the resistor in the sixth embodiment.
Figure 22:
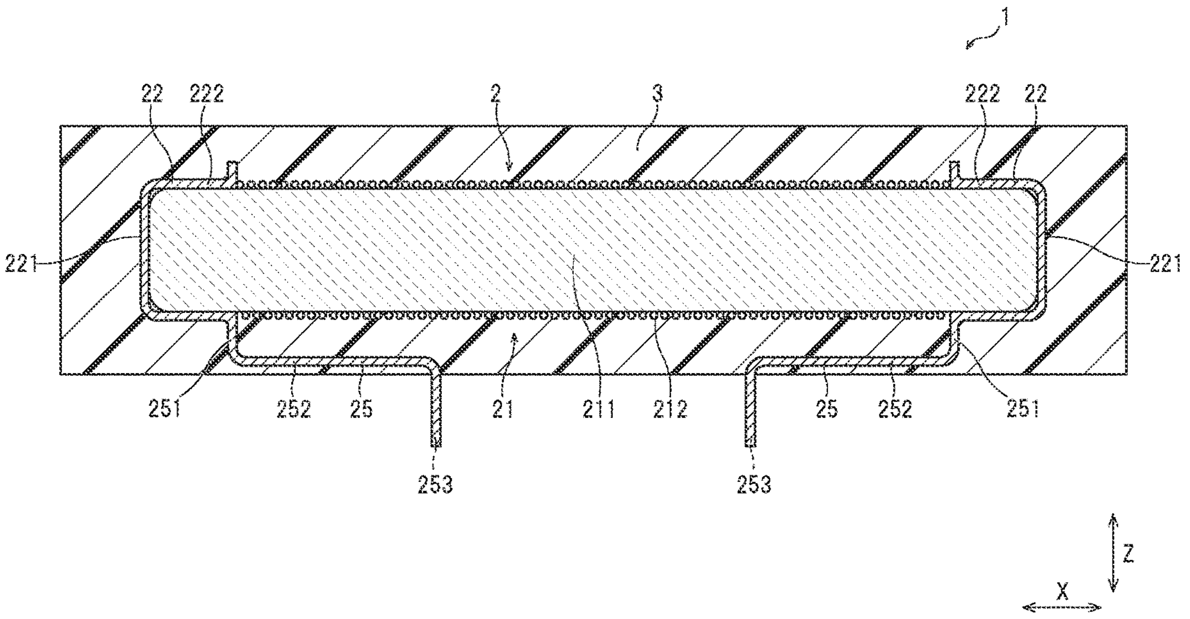
FIG. 22 is a cross-sectional view of the resistor in the sixth embodiment.

FIG. 20 is a perspective view of the resistor 1 in the present embodiment. FIG. 21 is a plan view of the resistor 1 in the present embodiment. FIG. 22 is a cross-sectional view of the resistor 1 in the present embodiment.

(Resistor 1)

The present embodiment has the same basic structure as the fifth embodiment, but the shape of the plate terminals 25 is changed. In the present embodiment, each of the pair of plate terminals 25 is bent in the thickness direction in the molded resin 3. In the present embodiment, the pair of plate terminals 25 have a symmetrical shape in the element longitudinal direction X. The respective ends of the pair of plate terminals 25 protrude from the molded resin 3 to the outside of the molded resin 3. Hereafter, the direction at right angles to the element longitudinal direction X in which the plate terminals 25 protrude from the molded resin 3 is referred to as the vertical direction Z, and the direction at right angles to the vertical direction Z and the element longitudinal direction X is referred to as the horizontal direction Y. The side where the plate terminal 25 protrudes from the molded resin 3 is referred to as the lower side, and the opposite side is referred to as the upper side. The expressions of up and down are for convenience and do not limit the posture of the resistor 1 with respect to the vertical direction, for example, in the state of use of the resistor 1.

The plate terminal 25 has a first plate portion 251, a second plate portion 252, and a third plate portion 253. The first plate portion 251 is connected to the cap electrode 22 and is formed as a plate at right angles to the element longitudinal direction X.

The second plate portion 252 is extended from the lower end of the first plate portion 251 toward the center side of the resistive element 21 in the element longitudinal direction X and is formed as a plate at right angles to the vertical direction Z. The second plate portion 252 constitutes a facing portion facing the resistive element 21 through the molded resin 3. When viewed from the upper side, the width of the second plate portion 252 in the transverse direction Y is larger than the width of the resistive element 21 in the transverse direction Y.

The third plate portion 253 extends from an end of the second plate portion 252 that is far from the first plate portion 251. The third plate portion 253 has a width in the transverse direction Y less than the width in the transverse direction Y of the second plate portion 252 and extends from an approximate center portion of the second plate portion 252 in the transverse direction Y. The third plate portion 253 is formed to be bent downwardly from the second plate portion 252.

The plate terminal 25 has the entire first plate portion 251, the entire second plate portion 252, and the upper end of the third plate portion 253 arranged within the molded resin 3, with most of the third plate portion 253 exposed from the molded resin 3. The resistor 1 is electrically connected to a circuit board or the like at the third plate portion 253 of the pair of plate terminals 25 exposed from the molded resin 3. The rest is the same as in the fifth embodiment.

(Method of Manufacturing the Resistor 1)

Figure 23:
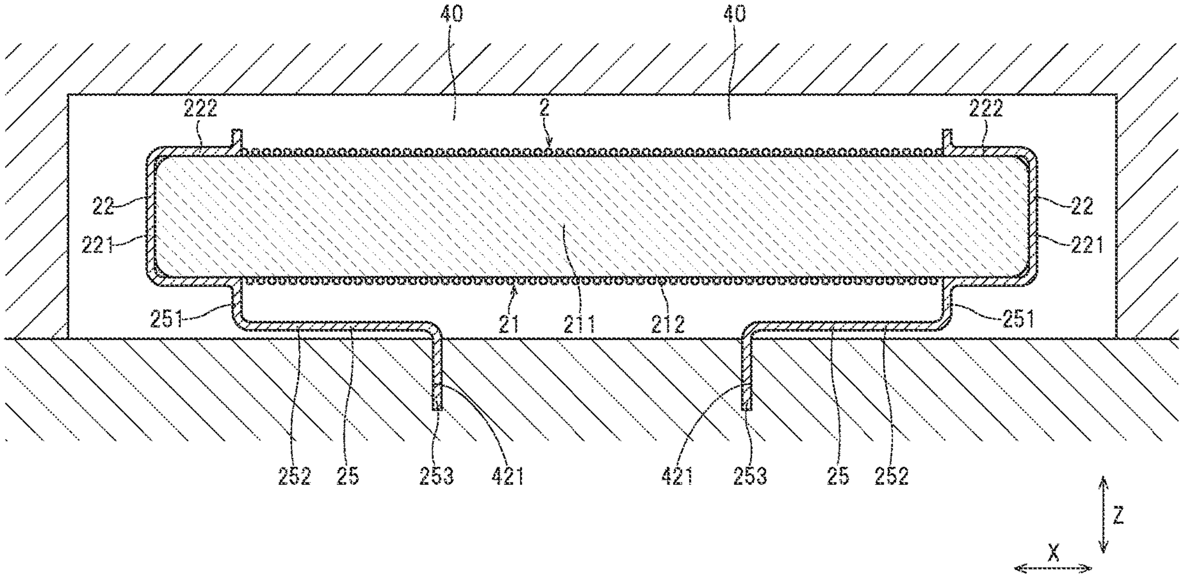
FIG. 23 is a cross-sectional view of the resistor in the sixth embodiment, showing the mold and the resistor after mold clamping.

Next, an example of the manufacturing method of the resistor 1 of the present embodiment is described using FIG. 23. First, the resistor body part 2 is manufactured. Next, the resistor body part 2 is set in the mold 4 for molding the molding resin 3. The mold 4 has an upper mold 41 and a lower mold 42 that are aligned in the vertical direction Z. The lower mold 42 is located on the lower side of the resistor body part 2 and is provided with insertion holes 421 for inserting the third plate portion 253. The resistor body part 2 is positioned with respect to the mold-clamped upper and lower molds 41 and 42 by inserting the third plate portion 253 of the pair of plate terminals 25 into the pair of insertion holes 421.

The molded resin 3 is then formed by injecting the raw material (i.e., the molding resin) in a molten state that will become the molded resin 3 into the cavity 40 in the mold 4 in which the resistor body part 2 is arranged and curing it.

(Functions and Effects of the Sixth Embodiment)

In the present embodiment, at least one of the pair of plate terminals 25 is bent in the thickness direction in the molded resin 3. Therefore, the heat dissipation of the entire resistor 1 can be improved. This is explained below.

Since the plate terminal 25 is a part of the resistor 1 where the thermal conductivity tends to be relatively high, heat dissipation from the plate terminal 25 to the circuit board, etc. connected to the plate terminal 25 is efficiently performed. Therefore, the plate terminal 25 is bent in the thickness direction in the molded resin 3, which makes it easier for the plate terminal 25 to absorb heat diffused from the resistive element 21 to the molded resin 3, thereby improving the efficiency of heat dissipation through the plate terminal 25. As a result, the heat dissipation of the resistor 1 as a whole can be improved according to the present embodiment.

At least one of the pair of plate terminals 25 has an opposing portion (in the present embodiment, the second plate portion 252) inside the molded resin 3 that faces the resistive element 21 through a portion of the molded resin 3. Hence, the heat transfer efficiency from the resistive element 21 to the opposing part through the molded resin 3 can be increased, and the heat of the resistive element 21 is easily led to the plate terminal 25. This improves the heat dissipation from the plate terminal 25 to the circuit board, etc. to which the plate terminal 25 is connected, resulting in improved heat dissipation of the entire resistor 1. Other functions and effects are the same as those of the fifth embodiment.

In the present embodiment, the second plate portion 252 is formed from the first plate portion 251 toward the center side of the resistive element 21 in the element longitudinal direction X. However, this is not limited to this example. For example, the second plate portion 252 may be formed from the first plate portion 251 toward the side away from the center of the resistive element 21 in the element longitudinal direction X.

(Summary of the Embodiments)

Next, the technical concepts that can be grasped from the above-described embodiments will be described with the help of the characters, etc. in the embodiments. However, each character, etc. in the following description is not limited to the members, etc. specifically shown in the embodiments as the constituent elements in the scope of claims.

According to the feature [1], a resistor (1) includes a resistor body part (2), and a molded resin (3) in which the resistor body part (2) is embedded, and the molded resin (3) includes a base resin (31) and a filler (32) having a higher thermal conductivity than the base resin (31).

According to the feature [2], in the resistor (1) as described in the feature [1], the thermal conductivity of the molded resin (3) is 3 W/(m·K) or more and 10 W/(m·K) or less.

According to the feature [3], in the resistor (1) as described in the feature [1] or [2], the resistor body part (2) includes a resistive element (21), a pair of lead wires (23) electrically connected to the resistive element (21), and a pair of cylindrical sleeve members (24) through which the pair of lead wires (23) respectively are inserted, and at least a portion of each of the pair of sleeve members (24) is exposed from the molded resin (3).

According to the feature [4], in the resistor (1) as described in the feature [1] or [2], the resistor body part (2) includes a resistive element (21) and a pair of cap electrodes (22) mated to both ends of the resistive element (21), wherein at least a portion of each of the pair of cap electrodes (22) is exposed from the molded resin (3).

According to the feature [5], in the resistor (1) as described in the feature [4], a first part of each of the pair of cap electrodes (22) is exposed from the molded resin (3) and a second part of each thereof is embedded within the molded resin (3).

According to the feature [6], in the resistor (1) as described in the feature [1] or [2], the resistor body part (2) further comprises a resistive element (21) and a pair of plate terminals (25) electrically connected to the resistive element (21), wherein at least a portion of each of the pair of plate terminals (25) is exposed from the molded resin (3).

According to the feature [7], in the resistor (1) as described in the feature [6], at least one of the pair of plate terminals (25) is bent in a thickness direction in the molded resin (3).

According to the feature [8], in the resistor (1) as described in the feature [6] or [7], at least one of the pair of plate terminals (25) has a facing portion (252) inside the molded resin (3), which faces the resistive element (21) through a portion of the molded resin (3).

According to the feature [9], a method for manufacturing the resistor (1) as described in any one of the features [1] to [8] includes the steps of manufacturing the resistor body part (2), placing the resistor body part (2) inside a mold (4), injecting a raw material for the molded resin (3) in a molten state inside the mold (4) and curing the raw material to form the molded resin (3).

According to the feature [10], a method for manufacturing the resistor (1) as described in the feature [3] includes the steps of manufacturing the resistor body part (2), placing the resistor body part (2) in the mold (4) while gripping the portion to be exposed from the molded resin (3) in the pair of sleeve members (24) at the mold (4), injecting a raw material for molded resin (3) in a molten state in the mold (4), and curing the raw material to form the molded resin (3).

According to the feature [11], a method for manufacturing the resistor (1) as described in the feature [4] or [5] includes the steps of manufacturing the resistor body part (2), placing the resistor body part (2) in the mold (4) while gripping the portion to be exposed from the molded resin (3) at the pair of cap electrodes (22) at the mold (4), injecting a raw material for the molded resin (3) in a molten state into the mold (4), and curing the raw material to form the molded resin (3).

According to the feature [12], a method for manufacturing the resistor (1) as described in any one of the features [6] to [8] includes the step of manufacturing the resistor body part (2) and placing the resistor body part (2) in the mold (4) while gripping the portion to be exposed from the molded resin (3) at the pair of plate terminals (25) at the mold (4), injecting a raw material for the molded resin (3) in a molten state into the mold (4), and curing the raw material to form the molded resin (3).

(Supplementary Notes)

The above description of the embodiments of the invention is not intended to limit the invention as claimed in the claims. It should also be noted that not all of the combinations of features described in the embodiments are essential for the invention to solve the problems of the invention. In addition, the invention can be implemented with appropriate modifications to the extent that it does not depart from the intent of the invention.

The invention claimed is:

1. A resistor, comprising:

a resistor body part; and a molded resin in which the resistor body part is embedded, wherein the molded resin comprises a base resin and a filler having a higher thermal conductivity than the base resin, wherein the resistor body part comprises a resistive element and a pair of plate terminals electrically connected to the resistive element, and at least a portion of each of the pair of plate terminals is exposed from the molded resin, and wherein at least one of the pair of plate terminals comprises a facing portion inside the molded resin, which faces the resistive element through a portion of the molded resin.

2. The resistor, according to claim 1, wherein the thermal conductivity of the molded resin is 3 W/(m·K) or more and 10 W/(m·K) or less.

3. The resistor, according to claim 1, at least one of the pair of plate terminals is bent in a thickness direction in the molded resin.

4. A method for manufacturing a resistor having a resistor body part and a molded resin in which the resistor body part is embedded, wherein the molded resin comprises a base resin and a filler having a higher thermal conductivity than the base resin, the method comprising:

manufacturing the resistor body part;

placing the resistor body part inside a mold; and injecting a raw material for the molded resin in a molten state inside the mold and curing the raw material to form the molded resin, wherein the resistor body part comprises a resistive element and a pair of plate terminals electrically connected to the resistive element, and at least a portion of each of the pair of plate terminals is exposed from the molded resin, wherein the resistor body part is placed in the mold while gripping the portion to be exposed from the molded resin at the pair of plate terminals at the mold, and wherein at least one of the pair of plate terminals comprises a facing portion inside the molded resin, which faces the resistive element through a portion of the molded resin.

* * * * *